(12) United States Patent
Sakai et al.

(10) Patent No.: US 11,676,361 B2
(45) Date of Patent: Jun. 13, 2023

(54) COMPUTER-READABLE RECORDING MEDIUM HAVING STORED THEREIN TRAINING PROGRAM, TRAINING METHOD, AND INFORMATION PROCESSING APPARATUS

(71) Applicants: FUJITSU LIMITED, Kawasaki (JP); RIKEN, Wako (JP); NATIONAL CANCER CENTER, Tokyo (JP)

(72) Inventors: Akira Sakai, Kawasaki (JP); Masaaki Komatsu, Wako (JP); Ai Dozen, Chuo (JP)

(73) Assignees: FUJITSU LIMITED, Kawasaki (JP); RIKEN, Wako (JP); NATIONAL CANCER CENTER, Tokyo (JP)

( * ) Notice: Subject to any disclaimer, the term of this patent is extended or adjusted under 35 U.S.C. 154(b) by 338 days.

(21) Appl. No.: 17/144,157

(22) Filed: Jan. 8, 2021

(65) Prior Publication Data
US 2021/0241460 A1 Aug. 5, 2021

(30) Foreign Application Priority Data
Jan. 30, 2020 (JP) .............................. JP2020-014105

(51) Int. Cl.
*G06T 7/11* (2017.01)
*G06N 3/04* (2023.01)
(Continued)

(52) U.S. Cl.
CPC ............ *G06V 10/30* (2022.01); *G06F 18/214* (2023.01); *G06N 3/04* (2013.01); *G06T 5/50* (2013.01);
(Continued)

(58) Field of Classification Search
None
See application file for complete search history.

(56) References Cited

U.S. PATENT DOCUMENTS

| 11,393,092 B2* | 7/2022 | Sun ........................ G06T 7/0014 |
| 2019/0304069 A1* | 10/2019 | Vogels ................... G06N 5/046 |
| 2019/0311202 A1* | 10/2019 | Lee ...................... G06F 18/2413 |

OTHER PUBLICATIONS

Ding, Mingyu, et al. "Every frame counts: Joint learning of video segmentation and optical flow." Proceedings of the AAAI Conference on Artificial Intelligence. vol. 34. No. 07. 2020. (Year: 2020).*

(Continued)

*Primary Examiner* — Sean M Conner
(74) *Attorney, Agent, or Firm* — Xsensus LLP

(57) ABSTRACT

A method includes: acquiring data including moving image obtained by photographing a target and annotation images each indicative of a region of the target in each of frame images in the moving image; executing a process using the data. The process includes: detecting the target in the frame images; inputting, to an auto-encoder, an image obtained by combining partial images including the target and peripheral region images of the target detected in a given number of preceding and succeeding second frame images in a time series of the moving image of a first frame image; inputting a partial image corresponding to the first frame image to a neural network performing a segmentation; updating parameter of the auto-encoder and the neural network based on a difference between an image obtained by combining images from the auto-encoder and the neural network and a partial image of the annotation image.

18 Claims, 17 Drawing Sheets

(51) Int. Cl.
*G06V 10/30* (2022.01)
*G06T 5/50* (2006.01)
*G06T 7/00* (2017.01)
*G06F 18/214* (2023.01)

(52) U.S. Cl.
CPC .............. *G06T 7/0012* (2013.01); *G06T 7/11* (2017.01); *G06T 2207/10132* (2013.01)

(56) References Cited

OTHER PUBLICATIONS

Li, Jia, Changqun Xia, and Xiaowu Chen. "A benchmark dataset and saliency-guided stacked autoencoders for video-based salient object detection." IEEE Transactions on Image Processing 27.1 (2017): 349-364. (Year: 2017).*

Claus, Michele, and Jan Van Gemert. "Videnn: Deep blind video denoising." Proceedings of the IEEE/CVF conference on computer vision and pattern recognition workshops. 2019. (Year: 2019).*

Patraucean, Viorica, Ankur Handa, and Roberto Cipolla. "Spatio-temporal video autoencoder with differentiable memory." arXiv preprint arXiv:1511.06309 (2015). (Year: 2015).*

Sadda Praneeth et al., "Real-Time Medical Video Denoising with Deep Learning: Application to Angiography", International Journal of Applied Information Systems, May 1, 2018, pp. 22-28, XP055814412.

Agisilaos Chartsias et al., "Factorised Reprensentation Learning in Cardiac Image Analysis", Arxiv. Org, Cornell University Ithaca, NY 14853, Mar. 22, 2019, pp. 1-18, XP081156788.

Extended European Search Report dated Jun. 28, 2021, in European Patent Application No. 21 150 698.5.

Redmon et al., "You Only Look Once: Unified, Real-Time Object Detection", May 9, 2016, pp. 1-10.

* cited by examiner

EXAMPLE OF SECTIONAL VIEW OF THORAX
OF ULTRASONOGRAPHIC IMAGE

EXAMPLE OF SEGMENTATION RESULT OF INTERVENTRICULAR SEPTUM

COMPUTER-READABLE RECORDING MEDIUM HAVING STORED THEREIN TRAINING PROGRAM, TRAINING METHOD, AND INFORMATION PROCESSING APPARATUS

CROSS-REFERENCE TO RELATED APPLICATION

This application is based upon and claims the benefit of priority of the prior Japanese Patent Application No. 2020-014105, filed on Jan. 30, 2020, the entire contents of which are incorporated herein by reference.

FIELD

The present technology relates to a computer-readable recording medium having stored therein a training program, a training method, and an information processing apparatus.

BACKGROUND

A technology is available which performs, in order to detect a target from moving image data obtained by photographing a target, segmentation using a neural network (NNW) for each of frame images included in the moving image data.

As a first method, a technology is available in which a combined image (for example, an optical flow) representative of a motion of a target is inputted to one of two NNWs like a 2-way network and segmentation of the target is performed using a segmentation network for a still picture of the other one of the two NNWs.

As a second method, a technology is available in which several preceding and succeeding frame images of moving image data are inputted together to an NNW to perform segmentation of a target.

[Non-Patent Document 1] Joseph Redmon, Santosh Divvala, Ross Girshick, Ali Farhadi, "You Only Look Once: Unified, Real-Time Object Detection", arXiv: 1506.02640v5 [cs.CV], laid-open date: May 9, 2016

For example, a case is assumed in which moving image data is such moving image data that it includes much noise and indicates a small movement of a target like moving image data of an ultrasonography video or a surveillance video photographed by a surveillance camera and having comparatively-low picture quality. In the case where a target is detected from such moving image data as just described including a shape of the target, the first and second methods described above sometimes suffer from such inconveniences as described below.

The first method is suitable for segmentation of a target with movement like a running vehicle, in other words, a target whose position changes between image frames, because a combined image (for example, an optical flow) representative of a movement of the target is used as one of inputs. However, the first method is not suitable for detailed segmentation specified for a target region such as moving image data obtained by photographing a target whose change in position is comparatively small.

In the second method, it is difficult to perform training taking a frame image of a target for which segmentation is to be performed into consideration. Therefore, for example, even if a target does not appear in a target frame image, if the target appears in preceding or succeeding frame images of the target frame image, then there is the possibility that the NNW detects the target in the target frame image in error.

In this manner, it is considered that both of the first and second methods described above are low in robustness against noise of a frame image of moving image data in object detection of the frame image.

SUMMARY

According to an aspect of the embodiments, a non-transitory computer-readable recording medium having stored therein a training program that causes a computer to execute a process includes: acquiring training data including moving image data obtained by photographing a target and a plurality of annotation images each indicative of a region of the target in each of a plurality of frame images included in the moving image data; and executing a training process using the training data. The training process includes: detecting the target included in the plurality of frame images; inputting a combined image to an auto-encoder, the combined image being obtained by combining a plurality of partial images including the target and a plurality of peripheral region images of the target, the plurality of partial images and plurality of peripheral region images being detected in a given number of preceding and succeeding second frame images in a time series of the moving image data of a first frame image from among the plurality of frame images; inputting a partial image, in the plurality of partial images, corresponding to the first frame image to a neural network that performs a segmentation process for an image; and performing parameter update of the auto-encoder and the neural network, based on a difference between a combination output image obtained by combining an output image from the auto-encoder and an output image from the neural network and a partial image of the annotation image indicative of a region of the target in the first frame image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
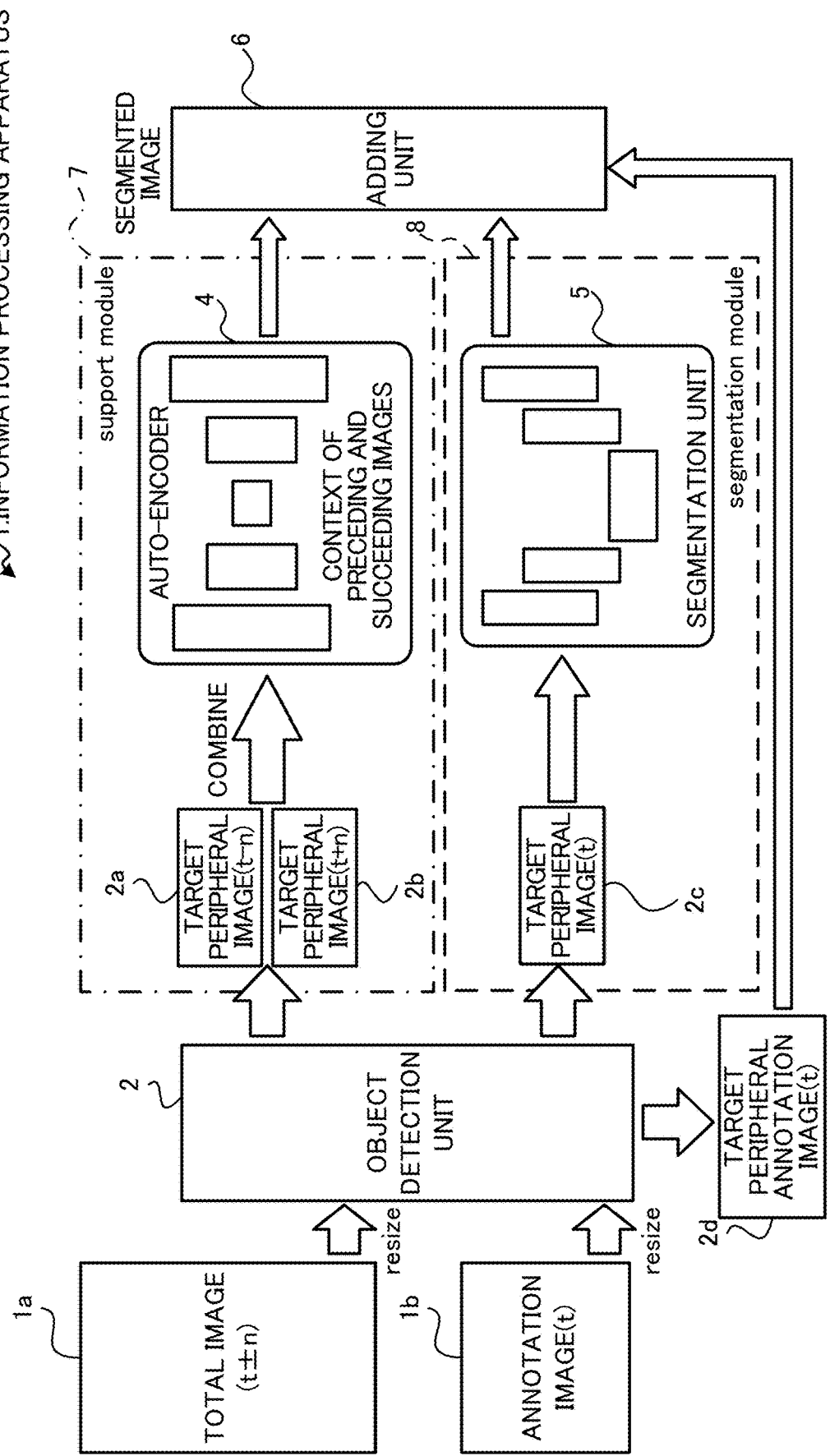
FIG. 1 is a view illustrating an example of a training process by an information processing apparatus according to an embodiment.

In the following, an embodiment of the present technology is described with reference to the drawings. However, the embodiment described below is illustrative to the end, and there is no intention to eliminate various modifications and applications of the technology that are not specified in the following. For example, the present embodiment can be carried out in various modified forms without departing from the subject matter of the present technology. It is to be noted that, unless otherwise specified, in the drawings referred to in the following description of the embodiment, same or like elements are denoted by like reference characters.

[1] Embodiment

[1-1] Description of Training Process by Information Processing Apparatus

FIG. 1 is a view illustrating an example of a training process by an information processing apparatus 1 according to the embodiment. It is to be noted that, in the description with reference to FIG. 1, "moving image data" signifies video data such as an echo image obtained by photographing a comparatively small target with respect to a size of a frame image and including noise, and "target" signifies a predetermined part of a photographing target of an echo image.

The information processing apparatus 1 acquires training data including moving image data obtained by photographing a target and multiple annotation images indicative of a region of the target in each of multiple frame images included in the moving image data. Then, the information processing apparatus 1 executes a training process using the training data.

For example, as depicted in FIG. 1, the information processing apparatus 1 executes processes of (a) to (d) described below for each of multiple frame images in the training process. As an example, the processes of (a) to (d) may be repeatedly executed, changing while a first frame image that is a target (noticed) frame image in a time series order of the moving image data. In the following description, an entire frame image is sometimes referred to as "total image".

(a) The information processing apparatus 1 detects a target included in multiple frame images.

For example, as depicted in FIG. 1, the information processing apparatus 1 may detect a target included in (t−n)th to (t+n)th total images 1a in a time series of moving image data from among multiple frame images. The symbol "t" is a variable indicative of the first frame image. n indicates an integer equal to or greater than one and is an example of a given number (predetermined number). Further, (t−n)th to (t−1)th and (t+1)th to (t+n)th frame images are an example of n preceding and n succeeding second frame images 1a of the first frame image 1a. It is to be noted that, in FIG. 1 and the following drawings, the (t−n)th to (t+n)th total images are denoted by "total images (t±n)" for simplified illustration.

It is to be noted that the information processing apparatus 1 may detect the target included in an annotation image 1b of the (t)th total image 1a included in the training data in addition to the foregoing.

The information processing apparatus 1 may detect the target from the total image 1a and the annotation image 1b, for example, by an object detection unit 2. The object detection unit 2 may be a trained object detection model generated, for example, using a dataset of the training data for specifying a region of the target included in an input image, and may be an object detection NNW such as a YOLO as an example.

The object detection unit 2 may output target peripheral images 2a to 2c and a target peripheral annotation image 2d as a result of the detection of the target.

The target peripheral image 2a is multiple partial images including a target and a peripheral region of the target detected in n frame images preceding to the first frame image 1a, namely, in the (t−n)th to (t−1)th second frame images 1a.

The target peripheral image 2b is multiple partial images including a target and a peripheral region of the target detected in n frame images succeeding the first frame image 1a, namely, in the (t+1)th to (t+n)th second frame images 1a.

It is to be noted that, in FIG. 1 and the succeeding figures, for simplified illustration, the (t−n)th to (t−1)th target peripheral images 2a and (t+1)th to (t+n)th target peripheral images 2b are denoted by "target peripheral images (t−n)" and "target peripheral images (t+n)", respectively.

The target peripheral image 2c is a partial image including a target and a peripheral region of the target that are detected in the (t)th first frame image 1a.

The target peripheral annotation image 2d is a partial image including a target and a peripheral region of the target that are detected in the annotation image 1b, and is, for example, a partial image obtained by cutting out a partial region the same as that of the target peripheral image 2c from the annotation image 1b.

(b) The information processing apparatus 1 inputs a combined image obtained by combining the target peripheral images 2a and 2b to an auto-encoder 4.

For example, the information processing apparatus 1 may combine n target peripheral images 2a and 2b by lining up them in a channel direction.

The auto-encoder 4 is an example of a support module 7. For example, as the auto-encoder 4 is exemplified by an NNW in which the number of units in an intermediate layer is small in comparison with the number of units of each of an input layer and an output layer, such as an auto encoder.

(c) the information processing apparatus 1 inputs the target peripheral image 2c to a segmentation unit 5 that performs a segmentation process for an image.

The segmentation unit 5 is an example of a segmentation module 8. Although, as the segmentation unit 5, various NNWs for segmentation are available, in the embodiment, for example, the U-Net is used. It is to be noted that the segmentation unit 5 is not limited to the U-Net, and may be a different neural network that executes Semantic Segmentation or maybe a neural network that uses a segmentation method other than the Semantic Segmentation.

Each of the auto-encoder 4 and the segmentation unit 5 is an NNW that is a target to be trained in a training process.

(d) The information processing apparatus 1 performs parameter update of the auto-encoder 4 and the segmentation unit 5 on the basis of a difference between a combined output-image obtained by combining an output image from the auto-encoder 4 and an output image from the segmentation unit 5 and the target peripheral annotation image 2*d*.

The information processing apparatus 1 may generate the combined output-image by adding the output image from the auto-encoder 4 and the output image from the segmentation unit 5 for each pixel, for example, by an adding unit 6. The combined output-image is an example of a segmented image. Then, the information processing apparatus 1 may input the target peripheral annotation image 2*d*, for example, to the adding unit 6 and may train the auto-encoder 4 and the segmentation unit 5 by backward error propagation or the like on the basis of the difference between the combined output-image and the target peripheral annotation image 2*d*.

Consequently, the information processing apparatus 1 can train a support module 7 that outputs complementation information based on a context of preceding and succeeding images of the first frame image 1*a* on the basis of the target peripheral annotation image 2*d*. Further, the information processing apparatus 1 can train the segmentation module 8 on the basis of the target peripheral annotation image 2*d*.

Accordingly, in object detection of the frame image 1*a* of the moving image data, even if noise is included in the frame image 1*a*, a network for outputting a segmentation result focusing on the first frame image 1*a* can be constructed, considering the preceding and succeeding images of the first frame image 1*a*.

From the foregoing, with the information processing apparatus 1, robustness against noise of the frame image 1*a* in object detection of the frame image 1*a* of the moving image data can be improved.

Figure 2:
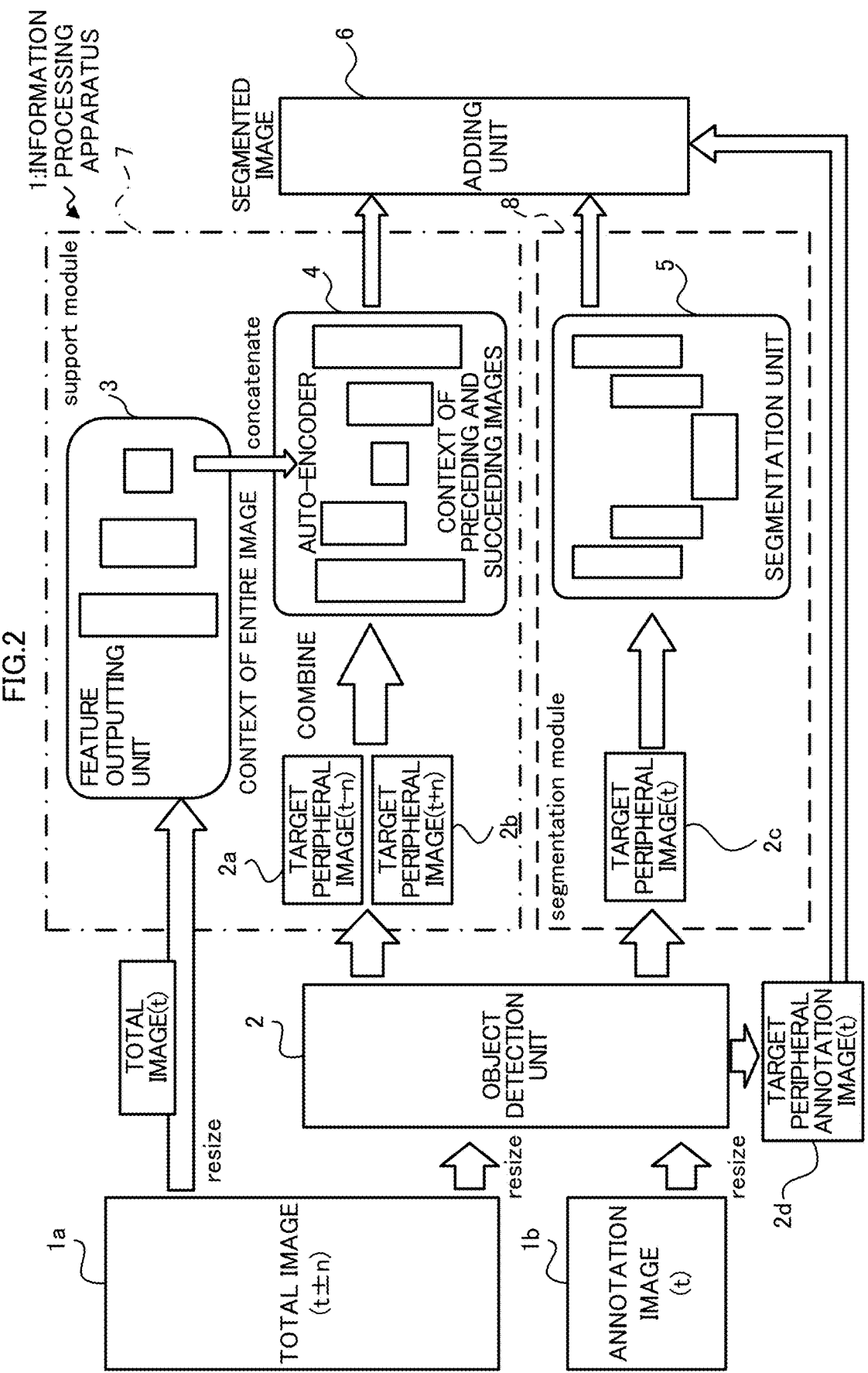
FIG. 2 is a view illustrating a different example of the training process by the information processing apparatus according to the embodiment.

Further, the information processing apparatus 1 according to the embodiment includes a feature outputting unit 3 in the support module 7 as exemplified in FIG. 2. The feature outputting unit 3 may be a trained model generated using a dataset of an image different from the frame image 1*a* obtained by photographing a target and may be a trained model for estimating a label to an input image.

As the feature outputting unit 3, for example, VGG-Backbone is available. The VGG-Backbone may be, for example, an NNW equivalent to a trained NNW such as a VGG from which an output layer is removed. As an example, the VGG-Backbone may be an NNW including a convolution layer and a pooling layer with a fully connected layer as an outputting later removed from a VGG. It is to be noted that the VGG is an example of a trained NNW usable in the embodiment. The trained NNW to be utilized in the embodiment is not limited only to the VGG (or the VGG-Backbone).

For example, the information processing apparatus 1 depicted in FIG. 2 may input a feature relating to the entire first frame image 1*a* obtained by inputting the (t)th first frame image (total image) 1*a* to the feature outputting unit 3, in other words, a context relating to the entire image, to an intermediate layer of the auto-encoder 4.

It is to be noted that the intermediate layer of the auto-encoder 4 may be a bottleneck of the auto-encoder 4 and may be, as an example, a layer in which the size (vertical and horizontal sizes) of an image to be processed is in the minimum from among layers of the auto-encoder 4.

Consequently, the auto-encoder 4 to which a combined image of the target peripheral images 2*a* and 2*b* is inputted can make use of the context of the entire image from the feature outputting unit 3 in addition to the context of preceding and succeeding images of the first frame image 1*a*. Accordingly, the accuracy of the output from the auto-encoder 4 can be enhanced.

[1-2] Example of Configuration of Embodiment

In the following description, a case in which the training process and the estimation process by the information processing apparatus 1 are utilized for decision of presence or absence of defect in a site called interventricular septum of the heart in ultrasonographic image diagnosis is described as an example.

Figure 3:
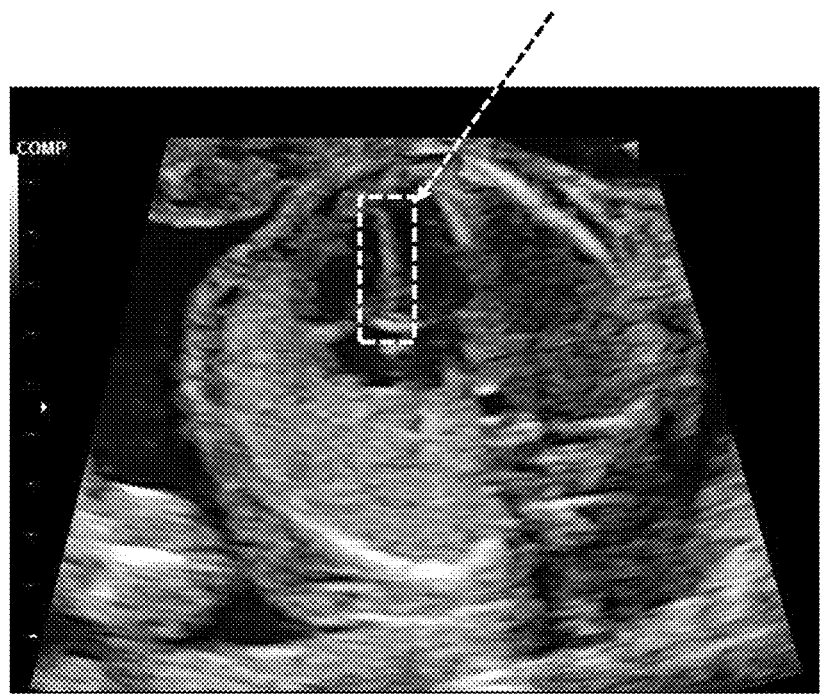
FIG. 3 is a view depicting an example of a sectional view of a thorax of an ultrasonographic image.
Figure 4:
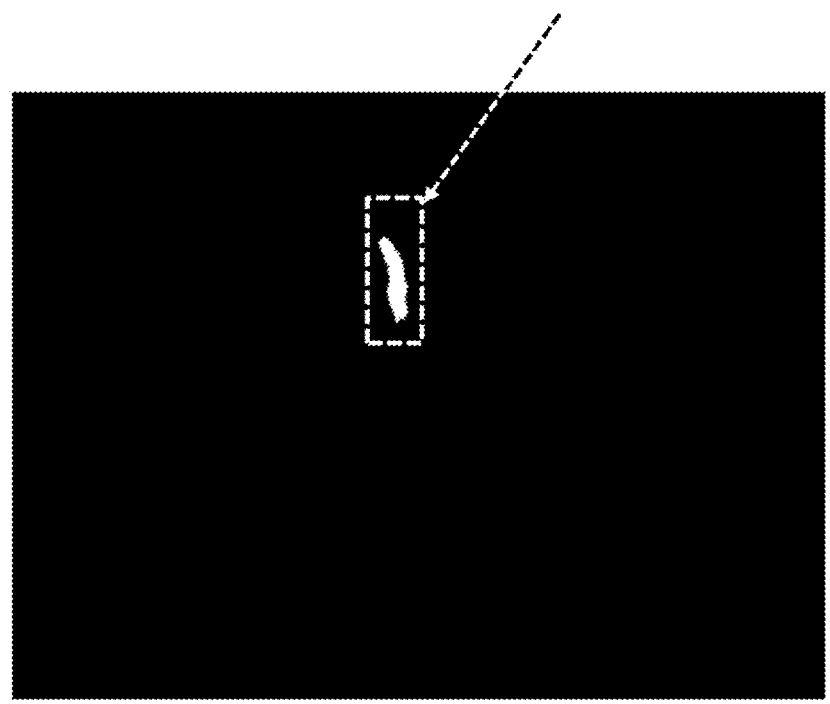
FIG. 4 is a view depicting an example of a segmentation result of a thoracic region.

As exemplified in FIG. 3, the interventricular septum included in an ultrasonographic image sometimes seems to have a defect by noise. Noise can appear at a position different for each frame image of moving image data. Accordingly, in order to decide presence or absence of a defect in the interventricular septum included in the first frame image, it is important to perform segmentation for a portion of the interventricular septum using information of preceding and succeeding second frame images of the first frame image as exemplified in FIG. 4.

Figure 5:
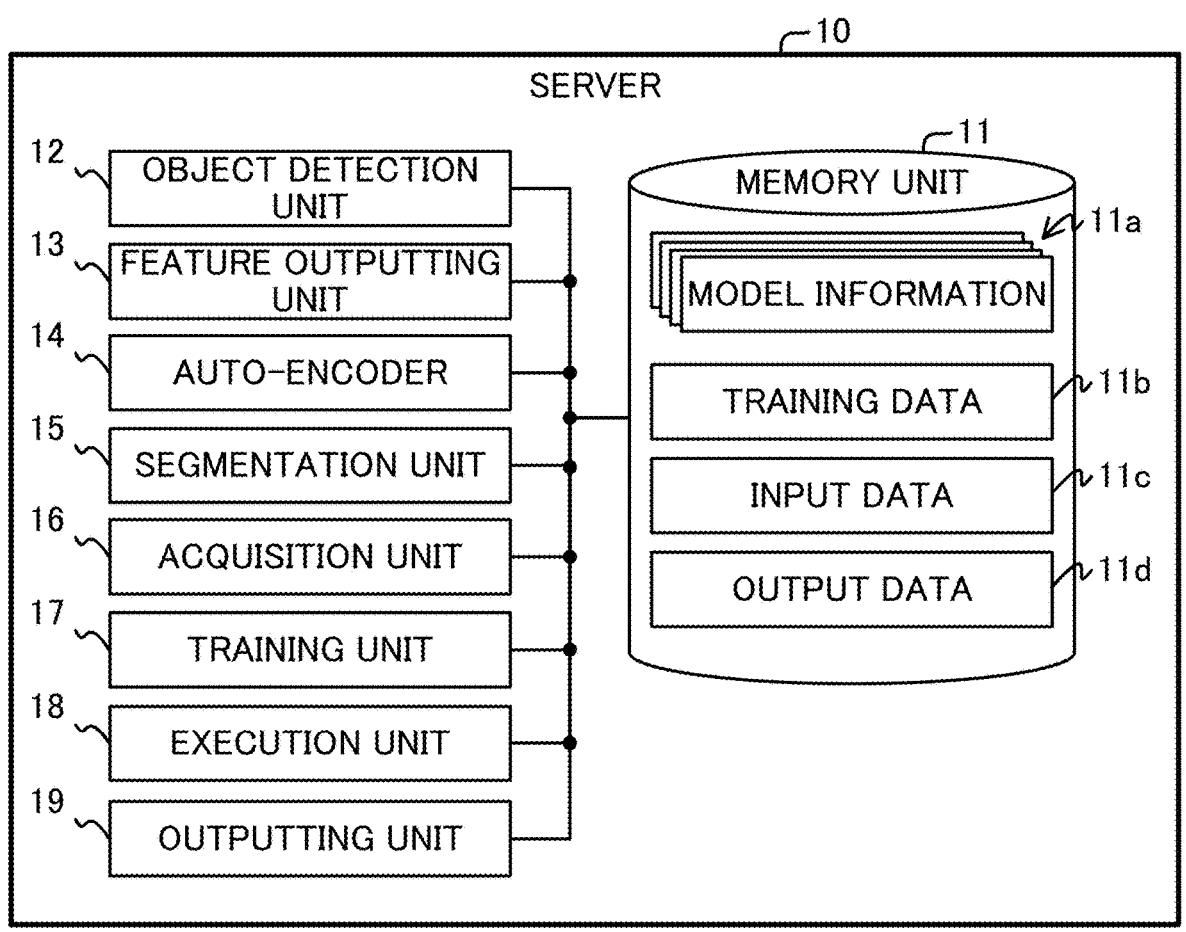
FIG. 5 is a block diagram depicting an example of a functional configuration of a server according to the embodiment.

FIG. 5 is a block diagram depicting an example of a functional configuration of a server 10 according to the embodiment. The server 10 is an apparatus that trains an NNW group for estimating a target from a frame image and estimates a target using the NNW group, and is an example of the information processing apparatus 1 depicted in FIG. 1.

In the description of the embodiment, it is assumed that the target of a segmentation target is an interventricular septum and the image for which segmentation is to be performed is an ultrasonographic image such as an echo image obtained by photographing the thoracic cage including the interventricular septum, for example, a fetus chest.

As depicted in FIG. 5, the server 10 may illustratively include a memory unit 11, an object detection unit 12, a feature outputting unit 13, an auto-encoder 14, a segmentation unit 15, an acquisition unit 16, a training unit 17, an execution unit 18 and an outputting unit 19.

The memory unit 11 is an example of a storage region and stores various information to be used for training the auto-encoder 14 and the segmentation unit 15, executing and outputting the estimation process using an NNW group and so forth. As depicted in FIG. 5, the memory unit 11 may be illustratively capable of storing multiple pieces of model information 11*a*, training data 11*b*, input data 11*c* and output data 11*d*.

The target detection unit 12 is an example of the target detection unit 2 depicted in FIG. 1, and, for example, the target detection unit 12 detects a target from each of multiple inputted images and outputs multiple partial images including the detected target and a peripheral image of the target. A partial region is generated, for example, by cutting out a region including a target and a peripheral region of the target in a rectangular shape from the inputted image.

The target detection unit 12 may be, for example, an object detection model generated using the training data 11*b* and trained in advance for specifying a region of the target included in an input image and may be an object detection NNW such as a YOLO as an example. For example, a manager or a utilizer of the server 10 may execute training of the target detection unit 12 in advance using the training data 11*b*.

The feature outputting unit 13 is an example of the feature outputting unit 3 depicted in FIG. 1. For example, the feature outputting unit 13 may be a trained model generated using a dataset of an image different from an image obtained by photographing a target and may be a trained model for estimating a label for an input image.

As the feature outputting unit 13, for example, a VGG-Backbone is available. As an example, the VGG-Backbone may be an NNW in which a fully connected layer as an outputting layer is removed from a VGG and which consequently includes a convolution layer and a pooling layer. It is to be noted that a VGG is an example of a trained NNW usable in the embodiment. A trained NNW usable in the embodiment is not limited only to a VGG (or a VGG-Backbone).

It is to be noted that, since the feature outputting unit 13 is generated using a dataset of an image different from an image of the training data 11*b*, the feature outputting unit 13 may be a model obtained by diverting or processing a trained NNW such as a VGG publicly opened on the Internet or the like.

The auto-encoder 14 is an example of the auto-encoder 4 depicted in FIG. 1. As the auto-encoder 14, for example, an NNW in which the number of units of an intermediate layer is smaller in comparison with those of the inputting layer and the outputting layer, as an example, an auto encoder, is available.

The feature outputting unit 13 and the auto-encoder 14 collectively serve as an example of the support module 7.

The segmentation unit 15 is an example of the segmentation unit 5 and an example of the segmentation module 8 depicted in FIG. 1. Although various segmentation NNWs are available as the segmentation unit 15, in the embodiment, for example, it is assumed that a U-Net is used. It is to be noted that the segmentation unit 15 is not limited to the U-Net and may be a different neural network for executing Semantic Segmentation or may be a neural network using a segmentation method other than the Semantic Segmentation.

Each of the auto-encoder 14 and the segmentation unit 15 is an NNW of a target a target to be trained in the training process in the server 10.

In the following description, the target detection unit 12, the feature outputting unit 13, the auto-encoder 14, and the segmentation unit 15 are sometimes referred to as "NNWs" or "NNW group".

Information of a network structure, various parameters and so forth for implementing the NNWs 12 to 15 may be stored as model information 11*a* for each of the NNWs 12 to 15 in the memory unit 11.

The acquisition unit 16 acquires information to be used for training and execution of the auto-encoder 14 and the segmentation unit 15, for example, from a computer not depicted.

For example, the acquisition unit 16 may acquire and store the training data 11*b* to be used for training of the auto-encoder 14 and the segmentation unit 15 into the memory unit 11.

The training data 11*b* may include moving image data obtained by photographing a target and multiple annotation images indicative of a region of the target in each of multiple frame images included in the moving image data.

Figure 6:
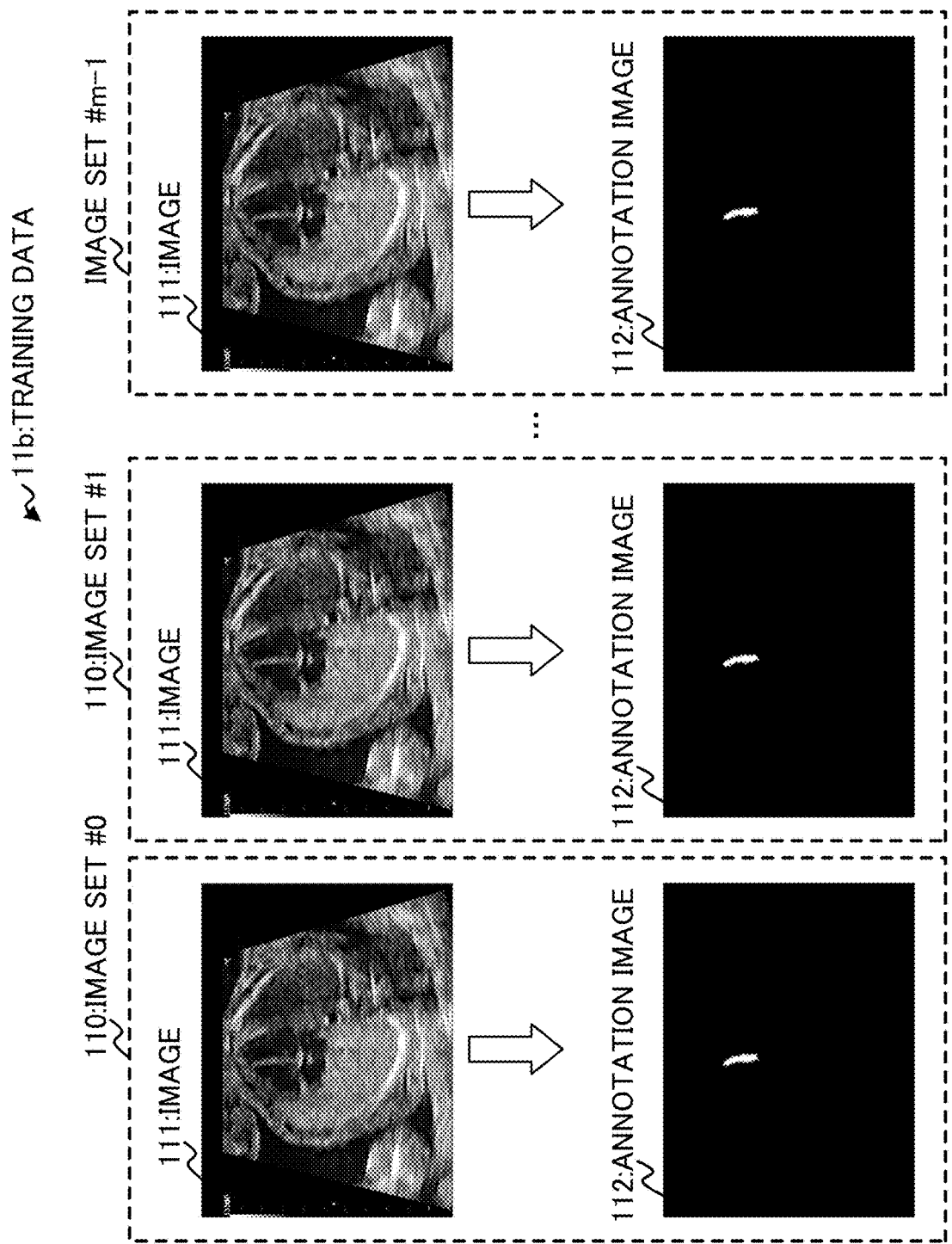
FIG. 6 is a view depicting an example of training data.

For example, the training data 11*b* may include m (m: two or more, for example, higher than n, integer) image sets 110 as depicted in FIG. 6. Each of the image sets 110 may include an image 111 obtained by photographing a target (that may be referred to as "training target") and an annotation image 112 as correct answer data of segmentation of the image 111.

The image 111 is an example of a frame image and, for example, may be an echo image obtained by photographing the interventricular septum that is an example of a target as depicted in FIG. 6. Each of the echo images in the multiple image sets 110 may be a frame cut out in a time series (for example, T=0 to (m−1)) from a series of echo images. The image 111 may be referred to as "total image".

The annotation image 112 is an example of an annotation image and is an image obtained by masking a target (in an example of FIG. 6, "interventricular septum") in the image 111 of the image set 110, for example, as depicted in FIG. 6. It is to be noted that "mask" signifies, for example, that a region of a mask target is displayed in a mode distinguishable from a region that is not the mask target, and, as an example, "mask" may signify that a region of a mask target is filled with a predetermined color (a predetermined color is set to pixels in a region of a mask target). In the example of FIG. 6, a masked region, in other words, a region corresponding to the thorax, is indicated by painting in white while the other region, in other words, any region other than the thorax, is indicated by paining in black.

It is to be noted that the server 10 may perform training of the auto-encoder 14 and the segmentation unit 15 using multiple training data 11*b*, in other words, using a dataset for multiple f moving image data.

Further, the acquisition unit 16 may acquire and store input data 11*c* to be used in the estimation process by the NNW groups 12 to 15 into the memory unit 11.

The input data 11*c* is an example of target data including target moving image data obtained by photographing an estimation target.

Figure 7:
FIG. 7 is a view depicting an example of input data.

For example, as depicted in FIG. 7, the input data 11*c* may include multiple images 113 obtained by photographing a target (that may be referred to as "estimation target").

The image 113 is an example of a target frame image and may be an echo image obtained by photographing the interventricular septum that is an example of the estimation target, for example, as depicted in FIG. 7. Each of the echo images included in the input data 11*c* may be a frame cut out in a time series (for example, T=0 to (m−1)) from a series of echo images. The image 113 may be referred to as "total image".

The training unit 17 is an example of a training execution unit and performs training of the auto-encoder 14 and the segmentation unit 15 using the training data 11*b* acquired by the acquisition unit 16.

The execution unit 18 is an example of an estimation processing unit that executes an estimation process of a region of the estimation target for the input data 11*c*. The execution unit 18 performs the estimation process of segmentation of a target for the input data 11*c* using the trained auto-encoder 14 and the segmentation unit 15 that are trained by the training unit 17 and the input data 11*c* that is acquired by the acquisition unit 16.

The outputting unit 19 may output (accumulate) a segmented image 115 that is to be described below and that is inputted from the execution unit 18 to (into) the memory unit 11, and generate output data 11*d* on the basis of multiple accumulated segmented images 115.

Figure 8:
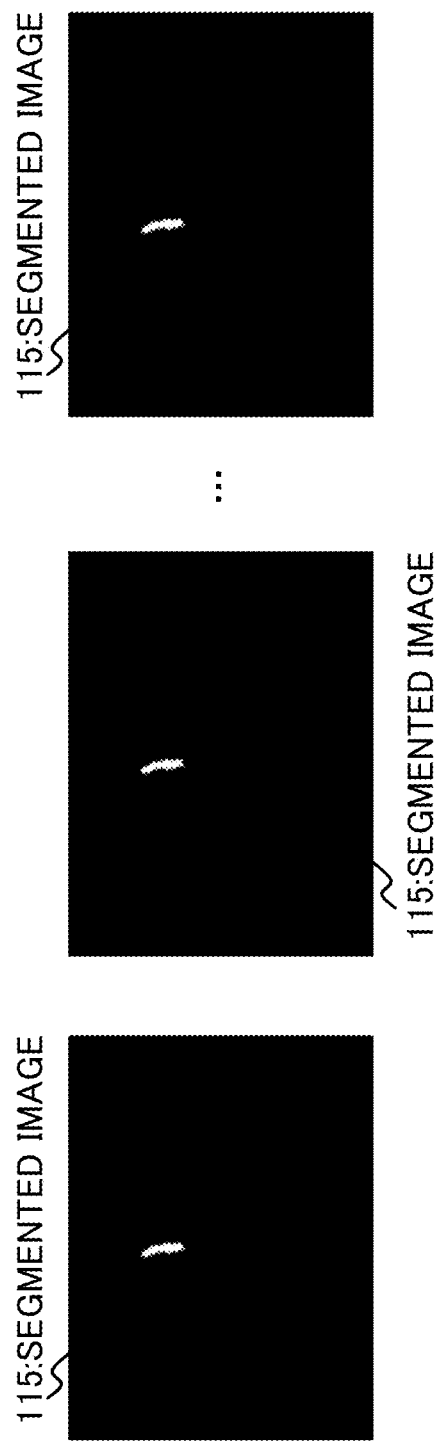
FIG. 8 is a view depicting an example of output data.

The output data 11*d* includes an image set including one or more segmented images 115, in other words, one or more output images, and, for example, may be moving image data of a video including multiple frame images. In the embodiment, as exemplified in FIG. 8, the output data 11*d* may be a video obtained by coupling the segmented images 115 in a time series as frame images.

It is to be noted that the outputting unit 19 may transmit the output data 11*d*, for example, to a computer not depicted.

[1-3] Example of Operation

Now, an example of operation of the server 10 configured in such a manner as described above is described.

[1-3-1] Example of Operation of Training Phase

Figure 9:
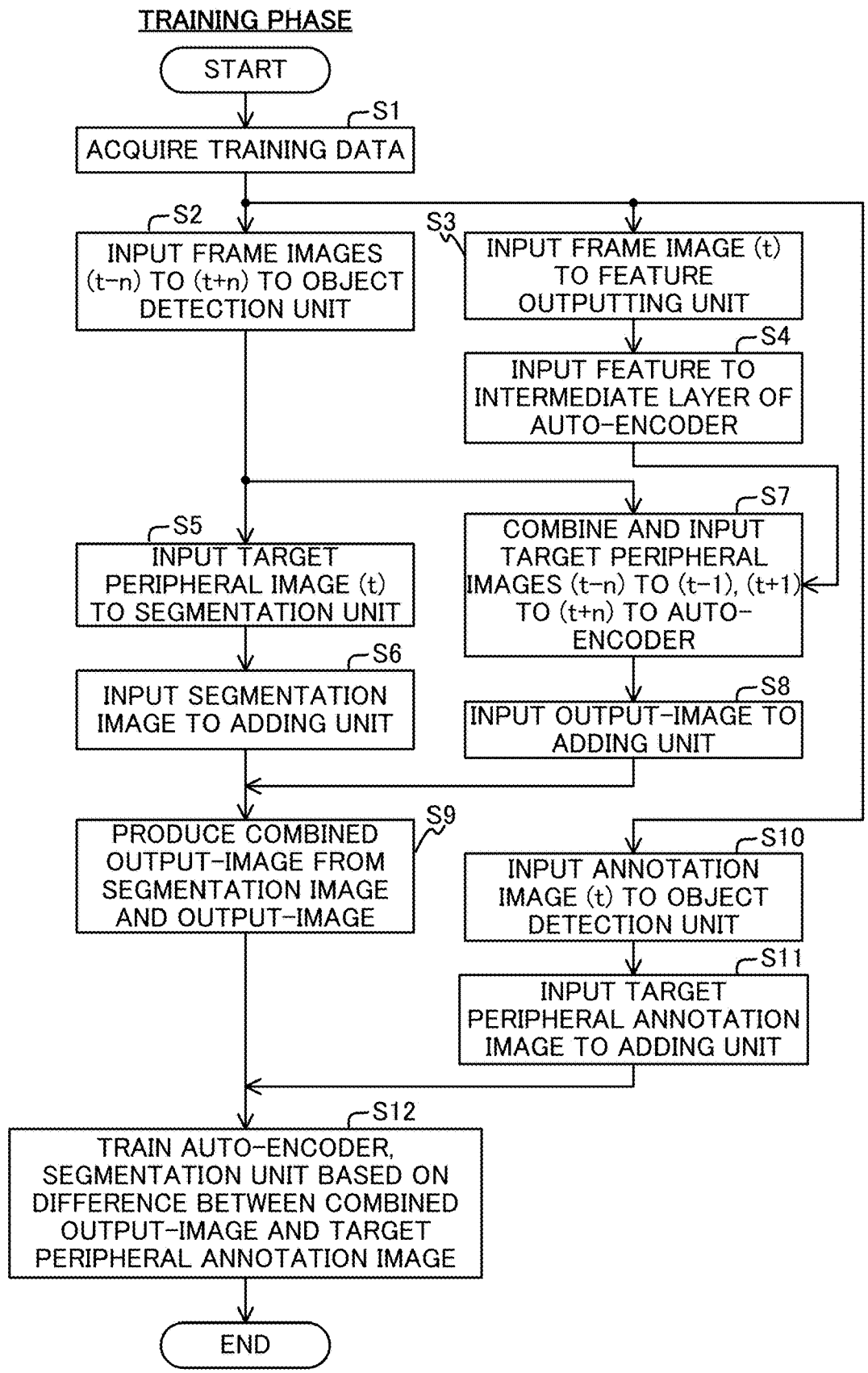
FIG. 9 is a flow chart illustrating an example of operation of a training phase.
Figure 10:
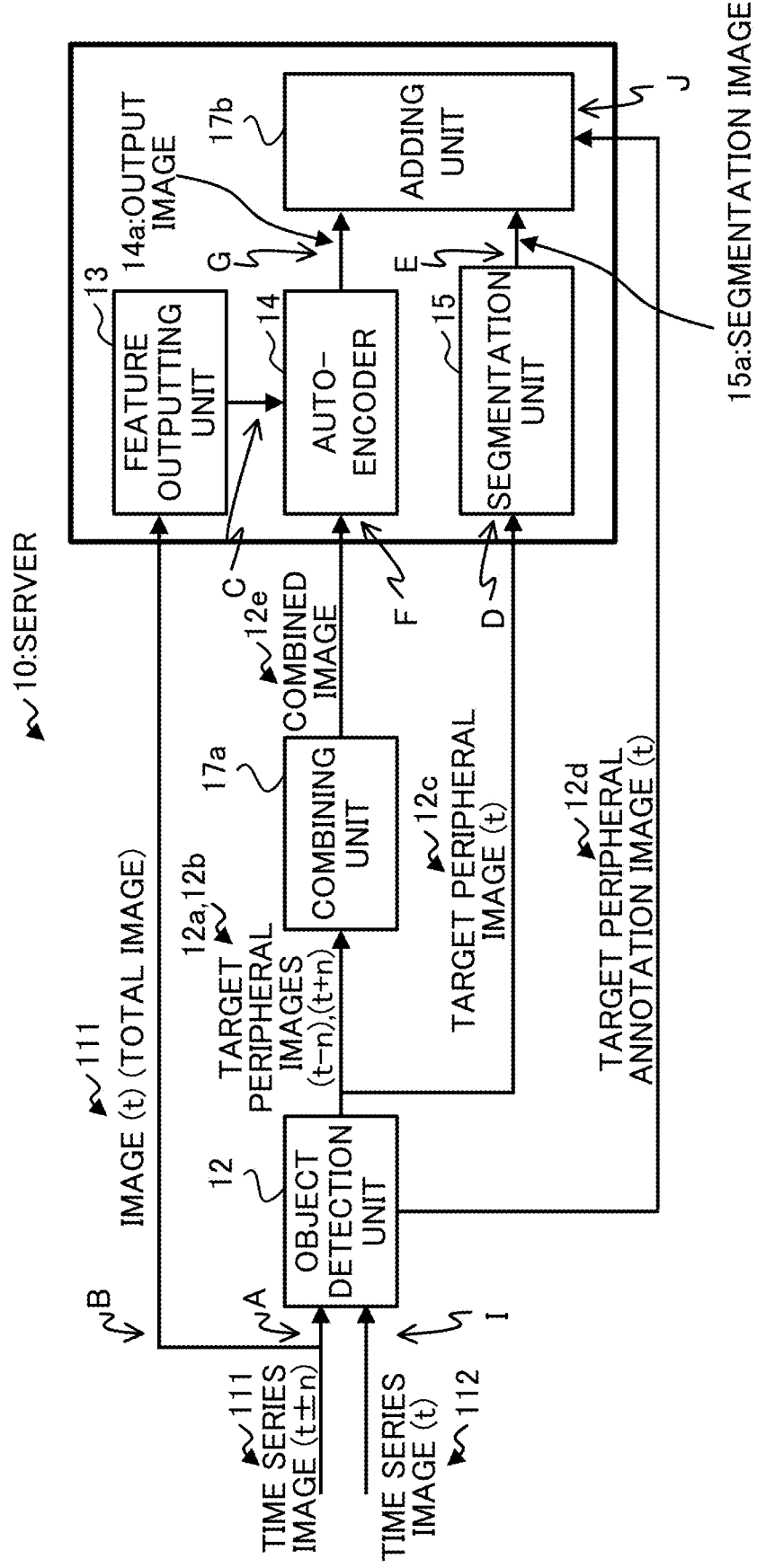
FIG. 10 is a view illustrating an example of operation of the training phase.

FIG. 9 is a flow chart illustrating an example of operation of the training phase, and FIG. 10 is a view illustrating an example of operation of the training phase.

The NNW groups 12 to 15 may be coupled to each other by the configuration depicted in FIG. 10 in the server 10. In order to perform training of the auto-encoder 14 and the segmentation unit 15 in the training phase, the training unit 17 may include a combining unit 17a and an adding unit 17b hereinafter described as exemplified in FIG. 10.

As exemplified in FIG. 9, the training unit 17 acquires (t−n)th to (t+n)th total images 111 and a (t)th annotation image 112 from time series images 111 included in training data 11b acquired by the acquisition unit 16 (step S1). In FIG. 10 and succeeding drawings, for simplified illustration, the (t−n)th to (t+n)th total images 111 are referred to as "total images (t±n)." It is to be noted that the value of n may be, as an example, "3" or the like.

The training unit 17 may generate total images 111 and an annotation image 112 by resizing the acquired (t−n)th to (t+n)th total images 111 and (t)th annotation image 112 into an input size to the target detection unit 12. Further, the training unit 17 may generate a total image 111 having a size resized to the input size to the feature outputting unit 13 from the size of the acquired (t)th total image 111.

The training unit 17 inputs the resized (t−n)th to (t+n) total images 111 to the target detection unit 12 (step S2: refer to reference character A of FIG. 10).

Further, the training unit 17 inputs the resized (t)th total image 111 to the feature outputting unit 13 (step S3: refer to reference character B of FIG. 10). The feature outing unit 13 extracts a feature (feature amount) of the inputted (t)th total image 111 and inputs the extracted feature to an intermediate layer of the auto-encoder 14 (step S4: refer to reference character C of FIG. 10).

Figure 11:
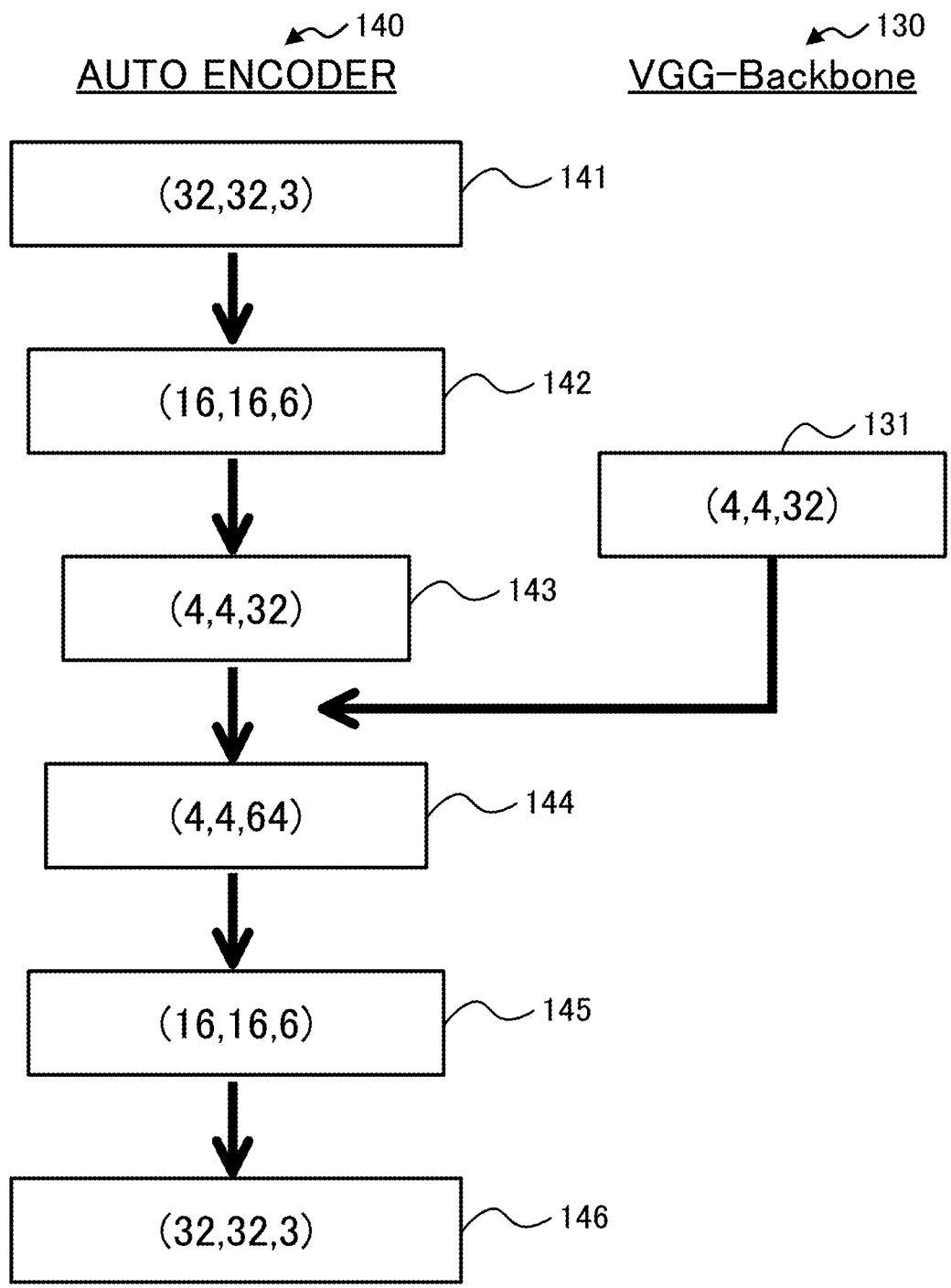
FIG. 11 is a view depicting an example of a configuration of a feature outputting unit and an auto-encoder.

FIG. 11 is a view depicting an example of a configuration of the feature outputting unit 13 and the auto-encoder 14. In the example depicted in FIG. 11, a VGG-Backbone (VGG backbone) 130 is an example of the feature outputting unit 13 and an Auto Encoder (auto encoder) 140 is an example of the auto-encoder 14.

As depicted in FIG. 11, the VGG backbone 130 at least includes a layer 131 that outputs the feature extracted by the VGG backbone 130. The auto encoder 140 includes multiple layers 141 to 146 such as a convolution layer. It is to be noted that, in the example of FIG. 11, one layer 131 of the VGG backbone 130 is depicted while illustration of layers in preceding stages to the layer 131 is omitted.

Referring to FIG. 11, (x, y, z) indicated in the blocks of the layer 131 and the layers 141 to 146 indicate a size of information to be utilized (processed) by the layers 131 to 141 to 146. For example, the symbols "x" and "y" indicate sizes in the vertical and horizontal directions of an image, and the symbol "z" indicates a channel number.

The feature outputted from the layer 131 of the VGG backbone 130 may be coupled (concatenated) in a channel direction to the output of the layer 143 of the auto encoder 140 and may be inputted to the layer 144 (refer to step S4 of FIG. 9 and reference character C of FIG. 10).

The layer 144 performs a process using information of (4, 4, 64) in which the output (4, 4, 32) of the layer 143 and the output (4, 4, 32) of the layer 131 are coupled to each other in the channel (z) direction. Further, the layer 145 performs a process in which the feature that is the output (4, 4, 32) of the layer 131 is taken into account, and outputs information of (16, 16, 6) whose size is equal to that of the opposing layer 142.

In this manner, the layer 144 is an example of an intermediate layer of the auto-encoder 14. The intermediate layer may be, as an example, a layer whose size (x, y) is in the minimum, or in other words, may be a bottleneck of the auto encoder 140.

It is to be noted that the intermediate layer of the auto encoder 140 that serves as an outputting designation of a feature from the layer 131 is not limited to the example depicted in FIG. 11 but may be any of various layers between the input layer 141 and the output layer 146 among the layers of the auto encoder 140.

Referring back to FIG. 9, the object detection unit 12 detects a target from each of the (t−n)th to (t+n)th total images 111 inputted in step S2 (reference character A in FIG. 10), and outputs target peripheral images 12a to 12c including the detected target and a peripheral region of the detected target.

For example, the training unit 17 inputs the (t)th target peripheral image 12c outputted from the object detection unit 12 to the segmentation unit 15 (step S5: refer to reference character D in FIG. 10). The segmentation unit 15 inputs a segmentation image 15a obtained by segmentation (for example, masking) of the target on the basis of the (t)th target peripheral image 12c to the adding unit 17b (step S6: refer to reference character E in FIG. 10).

Further, for example, the training unit 17 combines, by the combining unit 17a thereof, n (t−n)th to (t−1)th target peripheral images 12a and n (t+1)th to (t+n)th target peripheral images 12b outputted from the object detection unit 12 (refer to FIG. 10).

It is to be noted that, in FIG. 10 and the succeeding figures, the (t−n)th to (t−1)th target peripheral images 12a are represented as "target peripheral images (t−n)" and the (t+1)th to (t+n)th target peripheral images 12b are represented as "target peripheral images (t+n)" for simplified indication.

The combining unit 17a may line up, for example, n images in a channel direction to output a combined image 12e. As an example, the combining unit 17a may output two combined images 12e including a combined image 12e in which the n (t−n)th to (t−1)th target peripheral images 12a are used and another combined image 12e in which the n (t+1)th to (t+n)th target peripheral images 12b are used. It is to be noted that the combining unit 17a may otherwise output one combined image 12e, using the (t−n)th to (t−1)th and (t+1)th to (t+n)th target peripheral images 12a and 12b (2n images).

Then, the training unit 17 inputs the combined image 12e outputted from the combining unit 17a to the auto-encoder 14 (step S7: refer to reference character F in FIG. 10).

The auto-encoder 14 receives the combined images 12e of the (t−n)th to (t−1)th and (t+1)th to (t+n)th images as an input to the input layer and receives a feature inputted from the feature outputting unit 13 as an input to the intermediate layer thereof, and outputs an output image 14a from the output layer. In the example of FIG. 11, the input layer may be the layer 141; the intermediate layer may be the layer 144; and the output layer may be the layer 146.

The training unit 17 inputs the output image 14a outputted from the auto-encoder 14 to the adding unit 17b (step S8: refer to reference character G in FIG. 10).

Figure 12:
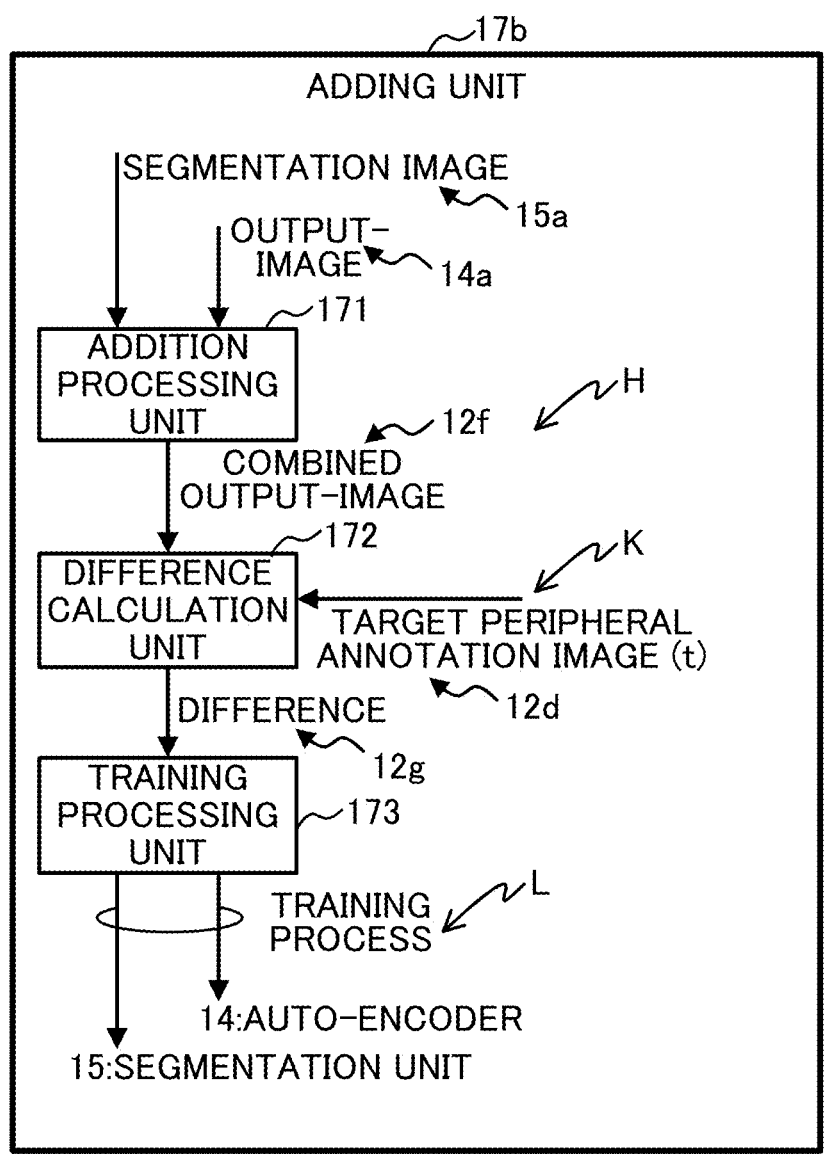
FIG. 12 is a view illustrating an example of a configuration and operation of an adding unit.

FIG. 12 is a view illustrating an example of a configuration and operation of the adding unit 17b. As depicted in FIG. 12, the adding unit 17b may illustratively include processing functions of an addition processing unit 171, a difference calculation unit 172 and a training processing unit 173.

The addition processing unit 171 adds a segmentation image 15a outputted from the segmentation unit 15 and an output image 14a outputted from the auto-encoder 14 for each cell to generate a combined output-image 12f (step S9: refer to reference character H in FIG. 12).

The difference calculation unit 172 calculates a difference 12g between the combined output-image 12f outputted from the addition processing unit 171 and a target peripheral annotation image 12d outputted from the object detection unit 12 and outputs the difference 12g to the training processing unit 173. As the calculation method for a difference by the difference calculation unit 172, various known methods such as, for example, a least squares method can be applied.

Here, the target peripheral annotation image 12d inputted to the difference calculation unit 172 is described. As depicted in FIG. 9, the training unit 17 inputs a resized (t)th annotation image 112 to the object detection unit 12 (step S10: refer to reference character I in FIG. 10).

It is to be noted that the inputting of the annotation image 112 to the object detection unit 12 (step S10) may be performed, for example, in parallel to the inputting of the (t−n)th to (t+n)th total images 111 to the object detection unit 12 and the feature outputting unit 13 (steps S2 and S3).

The object detection unit 12 outputs a target peripheral annotation image 12d obtained by cutting out, from the inputted (t)th annotation image 112, a partial region same as that of the (t)th target peripheral image 12c.

For example, the training unit 17 inputs the (t)th target peripheral annotation image 12d outputted from the object detection unit 12 to the difference calculation unit 172 of the adding unit 17b (step S11: refer to reference character J in FIG. 10 and reference character K in FIG. 12).

The training processing unit 173 performs training of the auto-encoder 14 and the segmentation unit 15 on the basis of the difference 12g calculated by the difference calculation unit 172 (step S12: refer to reference character L in FIG. 12), and the processing ends therewith.

As the training method of the auto-encoder 14 and the segmentation unit 15 by the training processing unit 173, various machine learning methods may be used. As an example, in a machine learning process, in order to reduce the difference 12g, namely, to reduce the value of an error function, a back propagation process of determining (updating) a parameter to be used in processes in a forward propagation direction by the auto-encoder 14 and the segmentation unit 15 may be executed. Then, in the machine learning process, an update process of updating a variable such as a weight may be executed on the basis of a result of the back propagation process.

The training unit 17 may repeatedly execute the machine learning process of the auto-encoder 14 and the segmentation unit 15, for example, using multiple image sets 110 included in training data 11b until a number of iterations, accuracy, or the like reaches a threshold value. The auto-encoder 14 and the segmentation unit 15 for which the training is completed are examples of a trained model.

For example, the training unit 17 may execute the processes in steps S1 to S12 depicted in FIG. 9 using each of the multiple total images 111 in the training data 11b as a first frame image by changing the value of (t) corresponding to the frame number in the moving image data. It is to be noted that the total images 111 up to the (n−1)th total image 111 from the top and the end in the moving image data as the training data 11b may be excluded from a selection target for a first frame image.

[1-3-2] Example of Operation of Estimation Phase

Figure 13:
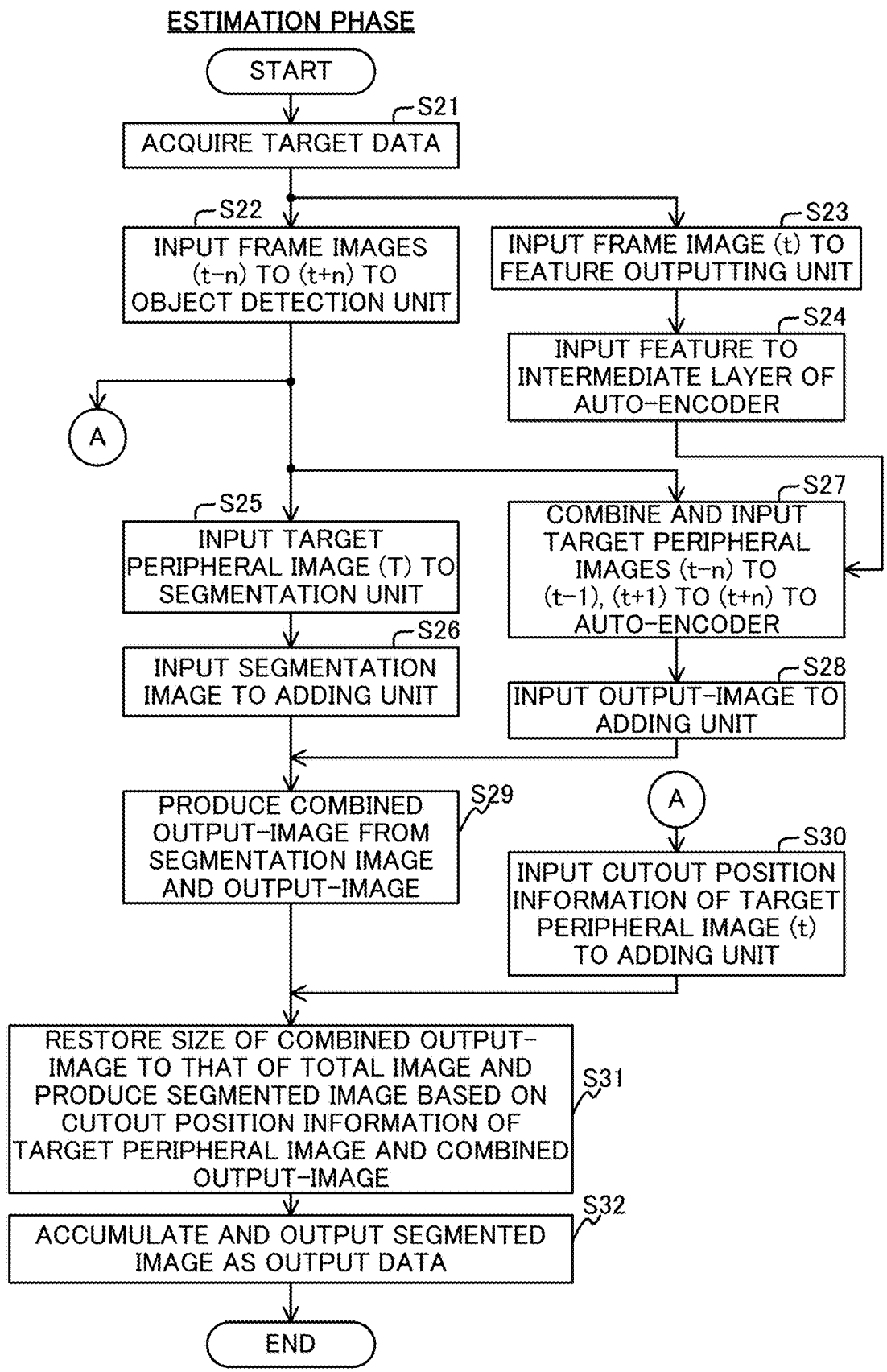
FIG. 13 is a flow chart illustrating an example of operation of an estimation phase.
Figure 14:
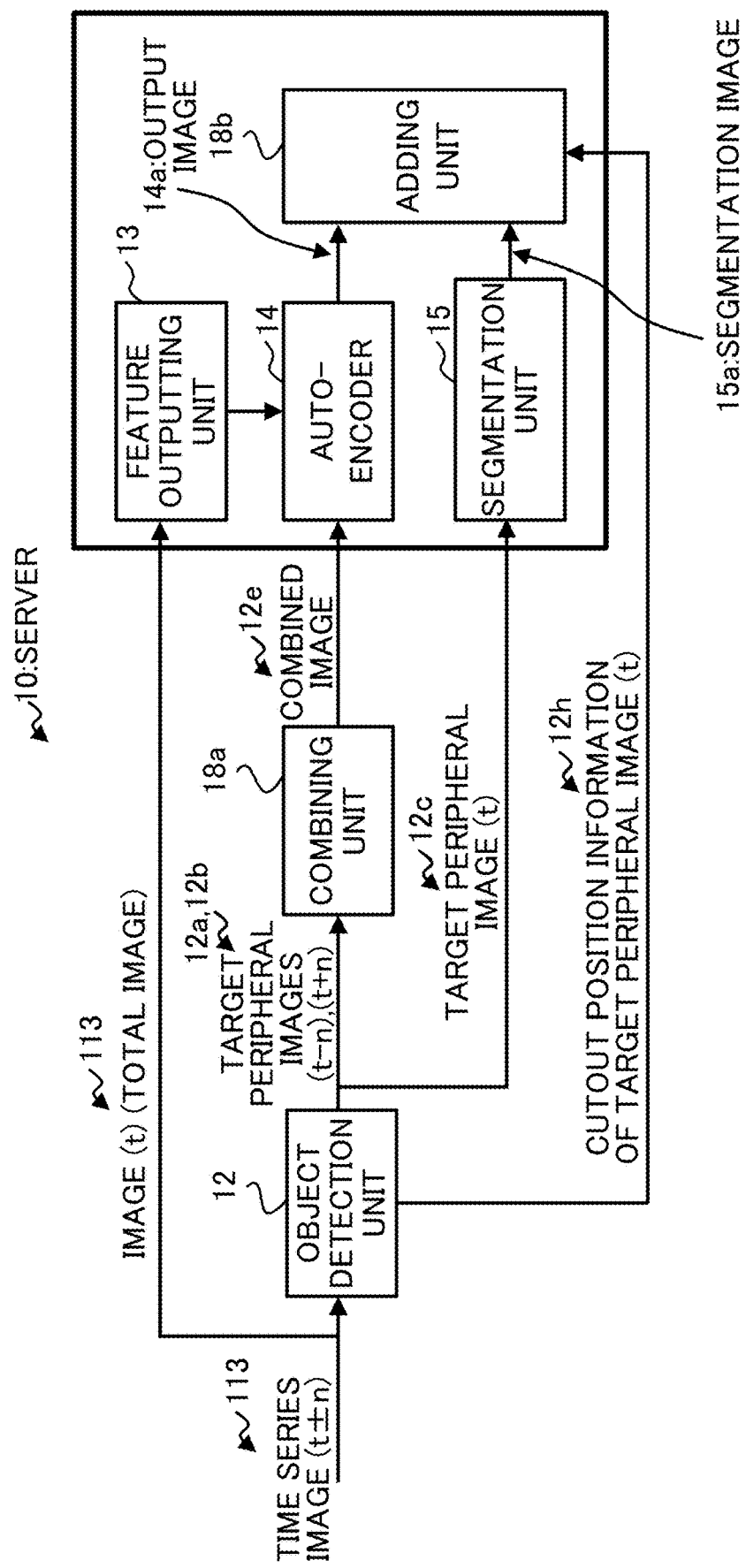
FIG. 14 is a view illustrating an example of operation of the estimation phase.
Figure 15:
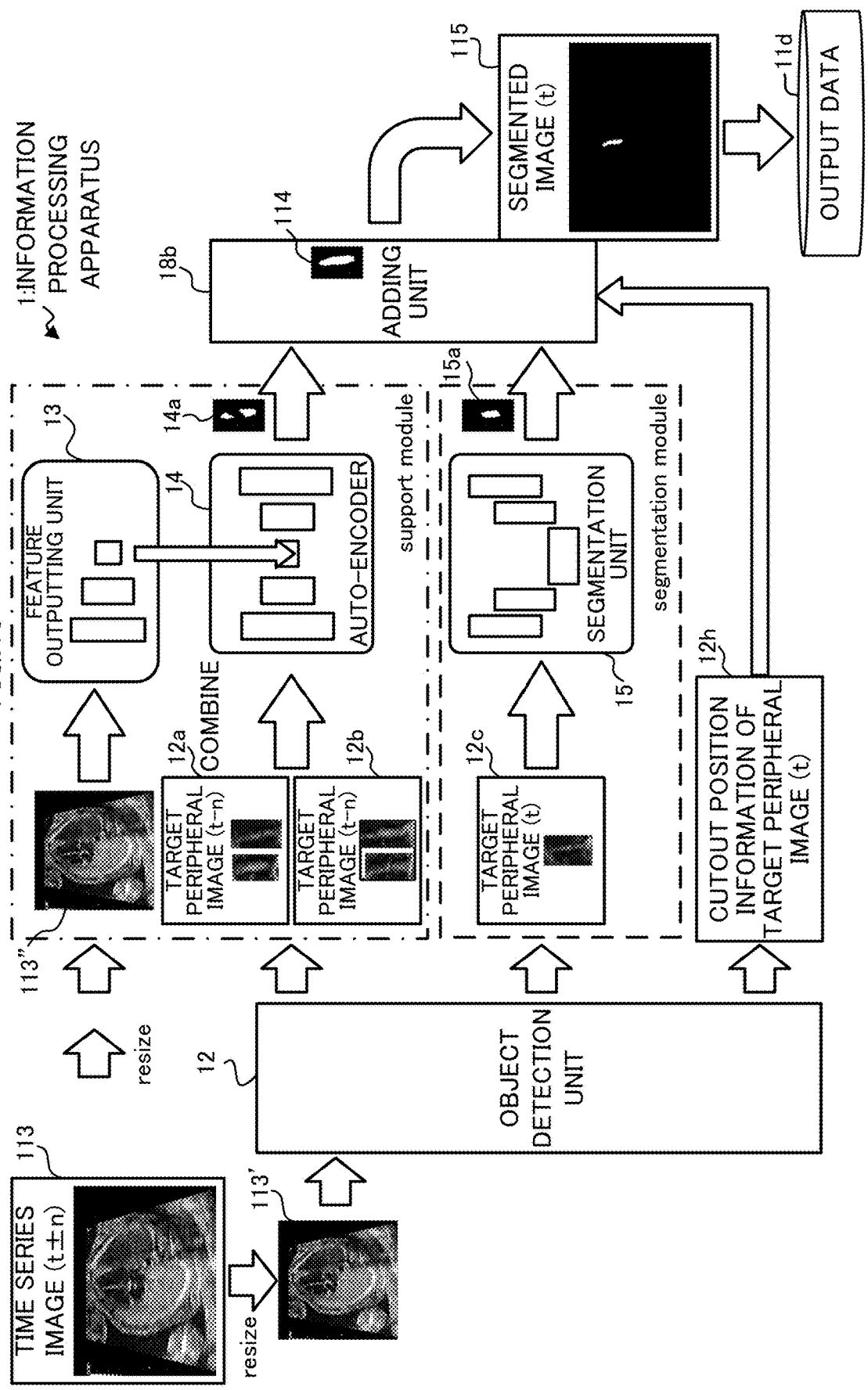
FIG. 15 is a view illustrating an example of operation of the estimation phase.

FIG. 13 is a flow chart illustrating an example of operation of the estimation phase, and FIGS. 14 and 15 are views illustrating an example of operation of the estimation phase.

The execution unit 18 may include a combination unit 18a and an adding unit 18b to be described below as exemplified in FIG. 14 in order to perform estimation of segmentation of an estimation target in the estimation phase. It is to be noted that the combination unit 18a may have a processing function similar to that of the combining unit 17a. Further, FIG. 14 is basically similar to FIG. 9 in terms of flows of data although it is different from FIG. 9 in reference character of the image 113, in that the annotation image 112 is not inputted to the object detection unit 12, in that the object detection unit 12 outputs cutout position information 12h of the target peripheral image 12c in place of the target peripheral annotation image 12d, and in the configuration of the adding unit 18b.

As exemplified in FIG. 13, the execution unit 18 acquires the (t−n)th to (t+n)th total images 113 from among the time series images 113 included in the input data 11c acquired by the acquisition unit 16 (step S21: refer to FIG. 14).

It is to be noted that the (t)th total image 113 is an example of a third frame image, and the (t−n)th to (t−1)th and (t+1)th to (t+n)th total images 113 are an example of a predetermined number of preceding and succeeding fourth frame images of the third frame image in the time series of target moving image data.

As depicted in FIG. 15, the execution unit 18 may generate total images 113', for example, by resizing the sizes of the acquired (t−n)th to (t+n)th total images 113 to the input size of the object detection unit 12. Further, the execution unit 18 may generate a total image 113" by resizing the size of the acquired (t)th image 113 to the input size of the feature outputting unit 13.

The execution unit 18 inputs the resized (t−n)th to (t+n)th total images 113' to the object detection unit 12 (step S22).

Further, the execution unit 18 inputs the resized (t)th total image 113" to the feature outputting unit 13 (step S23). The feature outputting unit 13 extracts a feature of the inputted (t)th total image 113" and inputs the extracted feature to the intermediate layer of the auto-encoder 14 (step S24).

The object detection unit 12 detects the estimation target from each of the (t−n)th to (t+n)th total images 113' inputted in step S22. Then, the object detection unit 12 outputs the target peripheral images 12a to 12c (refer to FIG. 15) including the detected estimation target and a peripheral region of the estimation target, in other words, multiple partial images.

For example, the execution unit 18 inputs the (t)th target peripheral image 12c outputted from the object detection unit 12 to the segmentation unit 15 trained with parameter update by the training unit 17 (step S25). The segmentation unit 15 inputs a segmentation image 15a (refer to FIG. 15) obtained by segmenting the estimation target on the basis of the inputted target peripheral image 12c to the adding unit 18b (step S26).

Further, for example, the execution unit 18 combines, by the combination unit 18a thereof, the n (t−n)th to (t−1)th target peripheral images 12a and the n (t+1)th to (t+n)th target peripheral images 12b outputted from the object detection unit 12.

The combination unit 18a may output a combined image 12e, for example, by lining up n images in the channel direction similarly to the combining unit 17a. It is to be noted that the combination unit 18a may output one combined image 12e using the (t−n)th to (t−1)th and (t+1)th to (t+n)th target peripheral images 12a and 12b (2n images).

Then, the execution unit 18 inputs the combined image 12e outputted from the combination unit 18a to the auto-encoder 14 trained already with parameter update by the training unit 17 (step S27).

The auto-encoder 14 receives the (t−n)th to (t−1)th and (t+1)th to (t+n)th combined images 12e as an input to the input layer thereof and receives the feature inputted from the feature outputting unit 13 as an input to the intermediate layer thereof, and outputs an output image 14a (refer to FIG. 15) from the output layer thereof.

The execution unit 18 inputs the output image 14a outputted from the auto-encoder 14 to the adding unit 18b (step S28).

Figure 16:
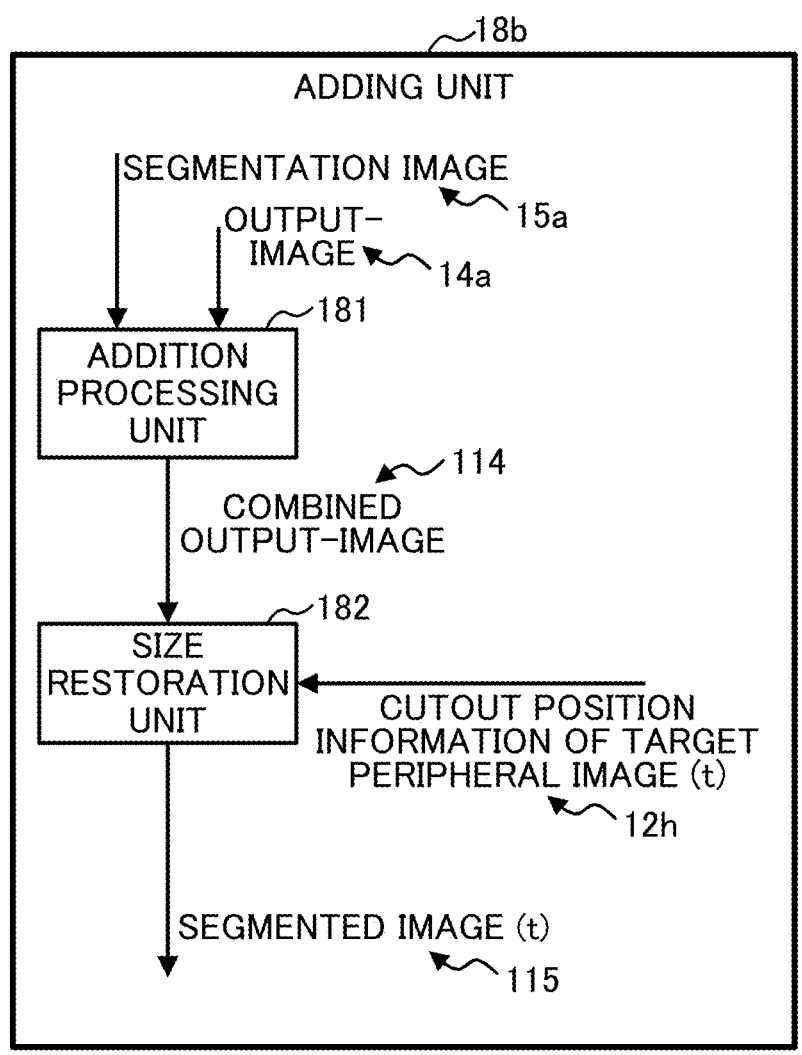
FIG. 16 is a view illustrating an example of a configuration and operation of the adding unit.

FIG. 16 is a view illustrating an example of a configuration and operation of the adding unit 18b. As depicted in FIG. 16, the adding unit 18b may illustratively include processing functions of an addition processing unit 181 and a size restoration unit 182.

The addition processing unit 181 adds the segmentation image 15a outputted from the segmentation unit 15 and the output image 14a outputted from the auto-encoder 14 for each pixel to generate a combined output-image 114 (refer to FIG. 15) (step S29).

The size restoration unit 182 receives as inputs thereto the combined output-image 114 outputted from the addition processing unit 181 and the cutout position information 12h of the target peripheral image 12c outputted from the object detection unit 12.

Here, the cutout position information 12h inputted to the size restoration unit 182 is described.

As depicted in FIG. 13, when the (t)th total image 113' is inputted in step S22, the object detection unit 12 outputs the cutout position information 12h of the target peripheral image 12c in the total image 113' together with the target peripheral image 12c. The execution unit 18 inputs, for example, the cutout position information 12h outputted from the object detection unit 12 to the size restoration unit 182 of the adding unit 18b (step S30: refer to FIGS. 15 and 16).

The cutout position information 12h is an example of position information indicative of the position in the (t)th total image 113' from which the (t)th target peripheral image 12c is cut out. As the cutout position information 12h, for example, coordinate information indicative of a cutout position (region) of the target peripheral image 12c in the total image 113' or like information is available.

The size restoration unit 182 returns, on the basis of the combined output-image 114 and the cutout position information 12h, the size of the combined output-image 114 to the original size of the total image 113 to generate a segmented image 115 (step S31). The segmented image 115 is an example of an image that includes a region estimated as an estimation target in the total image 113.

For example, the size restoration unit 182 may fit the combined output-image 114 into the original (t)th image 113 on the basis of the cutout coordinates indicated by the cutout position information 12h to perform restoration. For this purpose, for example, the (t)th total image 113 may be inputted in addition to the cutout position information 12h of the (t)th target peripheral image 12c.

The execution unit 18 may change, for example, the value of (t) corresponding to the frame number in the target moving image data to set each of the multiple total images 113 in the input data 11c as a third frame image to execute the processes in steps S21 to S31 depicted in FIG. 13. It is to be noted that the images 113 up to the (n−1)th image 113 from the top and the end in the moving image data as the input data 11c may be excluded from a selection target for a third frame image.

The outputting unit 19 accumulates the segmented images 115 and outputs output data 11d in which the accumulated segmented images 115 are combined to the output data 11d (step S32), and the processing ends therewith. It is to be noted that, as the outputting destination of the output data 11d, for example, a computer or the like not depicted is available in addition to the memory unit 11.

As above, the execution unit 18 and the outputting unit 19 are an example of an image outputting unit that outputs an image including a region estimated as an estimation target in a third frame image on the basis of the combined output-image 114 and the cutout position information 12h.

[1-4] Advantageous Effects of Embodiment

As above, with the server 10 according to the embodiment, segmentation of a target is performed by inputting the following three kinds of images 113 and 12a to 12c to the NNWs 13 to 15 different from one another and integrating outputs (results) from the NNWs 13 to 15.

For example, the server 10 inputs an image 12c, in which a peripheral region of a target in a frame image of the target is enlarged, to the segmentation unit 15. Further, the server 10 inputs images 12a and 12b in which a target peripheral region is enlarged in frame images preceding to and succeeding the frame image of the target to the auto-encoder 14. Furthermore, the server 10 inputs the image 113 of the entire frame of the target to the feature outputting unit 13.

Consequently, the auto-encoder 14 can output, based on the frame images preceding to and succeeding the frame image of the target, an output image 14a, from which an influence of noise of the object included in the frame image of the target has been decreased.

Accordingly, the robustness of the frame image against noise in object detection of a frame image of moving image data can be improved.

Further, for example, even in the case where at least p art of a target in moving image data whose picture quality is comparatively rough is hidden by noise, segmentation of the target including the region hidden by the noise can be performed precisely.

Furthermore, by providing context information of surroundings of portions cut out as the target peripheral images 12a and 12b, namely, of the total image, as an intermediate feature from the feature outputting unit 13 to the auto-encoder 14, the auto-encoder 14 can utilize information of portions other than the cutout portion.

For example, in the output image 14a based only on the target peripheral images 12a and 12b, the direction of the target in the output image 14a does not sometimes coincide with the correct direction of the target in the total image. Therefore, by providing a feature of the total image from the feature outputting unit 13 to the auto-encoder 14, the auto-encoder 14 can output the output image 14a that takes the direction of the target into consideration.

Further, from the server 10, the output image 14a from the auto-encoder 14 and the segmentation image 15a from the segmentation unit 15 are outputted. Consequently, for example, a user of the server 10 can compare, in the estimation phase, the output image 14a and the segmentation image 15a with each other to decide in what point the output image 14a has been amended with respect to the segmentation image 15a solely from the segmentation unit 15.

[1-5] Example of Hardware Configuration

Figure 17:
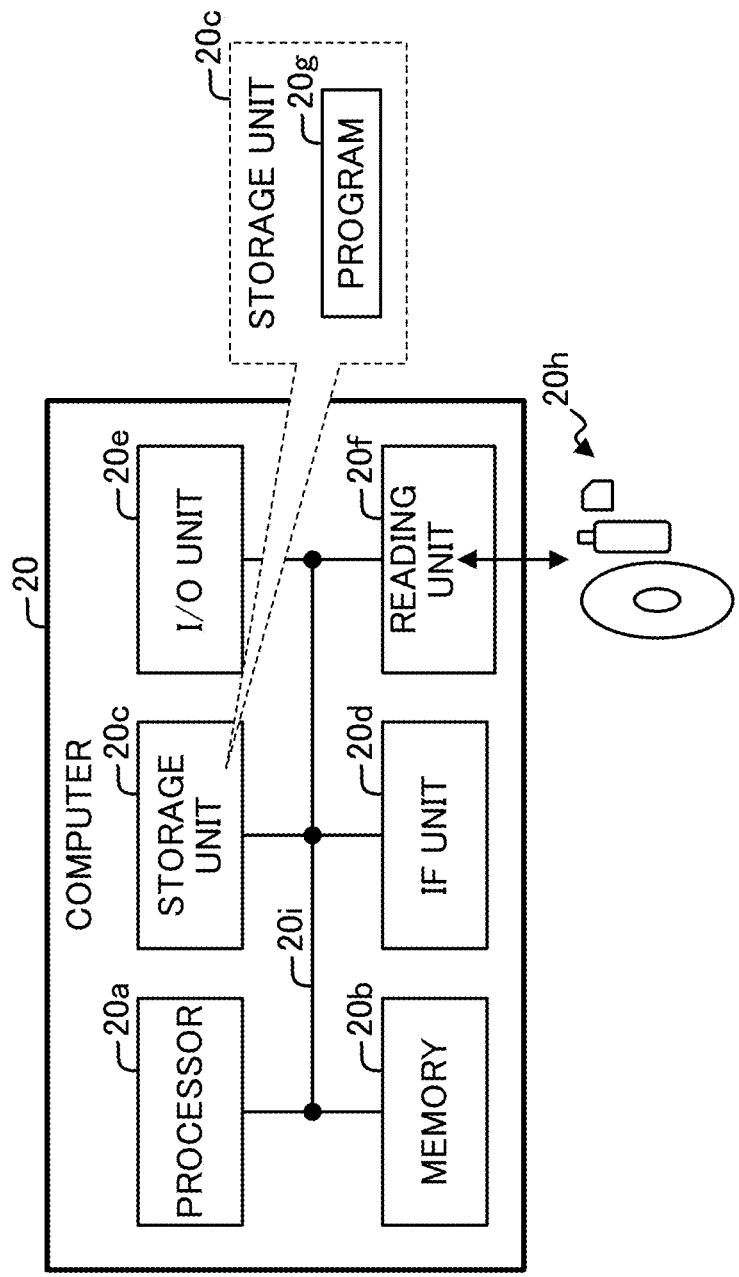
FIG. 17 is a block diagram depicting an example of a hardware configuration of a computer according to the embodiment.

FIG. 17 is a block diagram depicting an example of a hardware (HW) configuration of a computer 20 that implements the functions of the information processing apparatus 1 and the server 10. In the case where multiple computers are used as HW resources that implement the functions of the information processing apparatus 1 and the server 10, each computer may have the HW configuration exemplified in FIG. 17.

As depicted in FIG. 17, the computer 20 may illustratively include a processor 20a, a memory 20b, a storage unit 20c, an interface (IF) unit 20d, an input/output (I/O) unit 20e and a reading unit 20f as a hardware configuration.

The processor 20a is an example of an arithmetic processing unit that performs various controls and arithmetic operations. The processor 20a may be coupled for mutual communication to the blocks in the computer 20 by a bus 20i. It is to be noted that the processor 20a may be a multiprocessor including multiple processors or may be a multicore processor having multiple processor cores or otherwise may be configured so as to have multiple multi-core processors.

As the processor 20a, integrated circuits (ICs) such as, for example, a CPU, an MPU, a GPU, an APU, a DSP, an ASIC and an FPGA are available. It is to be noted that, as the processor 20a, a combination of two or more of such integrated circuits as mentioned above may be used.

For example, processing functions of at least part of the information processing apparatus 1, the acquisition unit 16 of the server 10, at least part of the training unit 17, at least part of the execution unit 18 and the outputting unit 19 may be implemented by a CPU, an MPU or the like as the processor 20a. Further, processing functions of at least part of the information processing apparatus 1, the NNWs 12 to 15 of the server 10, at least part of the training unit 17 and at least part of the execution unit 18 may be implemented by an accelerator such as a GPU or an ASIC (for example, a TPC) within the processor 20a.

CPU is an abbreviation of Central Processing Unit, and MPU is an abbreviation of Micro Processing Unit. GPU is an abbreviation of Graphics Processing Unit, and APU is an abbreviation of Accelerated Processing Unit. DSP is an abbreviation of Digital Signal Processor, and ASIC is an abbreviation of Application Specific IC and FPGA is an abbreviation of Field-Programmable Gate Array. TPU is an abbreviation of Tensor Processing Unit.

The memory 20b is an example of HW that stores information of various data, programs and so forth. As the memory 20b, one or both of a volatile memory such as a dynamic random access memory (DRAM) and a nonvolatile memory such as a persistent memory (PM) are available.

The storage unit 20c is an en example of HW that stores information of various data, programs and so forth. As the storage unit 20c, various storage devices such as a magnetic disk device such as a hard disk drive (HDD), a semiconductor drive device such as a solid state drive (SSD) and a nonvolatile memory are available. As the nonvolatile memory, for example, a flash memory, a storage class memory (SCM), a read only memory (ROM) and so forth are available.

Further, the storage unit 20c may store a program 20g (training program) that implements all or part of various functions of the computer 20. For example, the processor 20a of the information processing apparatus 1 can implement functions as the information processing apparatus 1 exemplified in FIGS. 1 and 2 by expanding the program 20g stored in the storage unit 20c on the memory 20b and executing the expanded program 20g. Further, the processor 20a of the server 10 can implement the functions as the server 10 exemplified in FIGS. 5, 10, 12, 14 and 16 by expanding the program 20g stored in the storage unit 20c on the memory 20b and executing the expanded program 20g.

It is to be noted that the storage region at least one of the memory 20b and the storage unit 20c has may be capable of storing the information 11a to 11d depicted in FIG. 5. In other words, the memory unit 11 of FIG. 5 may be implemented by a storage region at least one of the memory 20b and the storage unit 20c has.

The IF unit 20d is an example of a communication IF that performs control and so forth of coupling to and communication with a network. For example, the IF unit 20d may include an adapter that complies with a local area network (LAN) such as the Ethernet (registered trademark) or optical communication such as the Fibre Channel (FC) or the like. The adapter may be compatible with a communication method for one of or both wireless and wired communication. For example, the server 10 may be coupled for mutual communication to a different apparatus through the IF unit 20d. For example, the program 20g may be downloaded from the network to the computer 20 through the communication IF and stored into the storage unit 20c.

The I/O unit 20e may include one of or both an inputting apparatus and an outputting apparatus. As the inputting apparatus, for example, a keyboard, a mouse, a touch panel and so forth are available. As the outputting apparatus, for example, a monitor, a projector, a printer and so forth are available.

The reading unit 20f is an example of a reader for reading out information of data and programs recorded on a recording medium 20h. The reading unit 20f may include a connection terminal or device to or into which the recording medium 20h can be connected or inserted. As the reading unit 20f, for example, an adapter that complies with Universal Serial Bus (USB) or the like, a drive device that accesses a recording disk, a card reader that accesses a flash memory such as an SD card and so forth are available. It is to be noted that the recording medium 20h has the program 20g stored therein and the reading unit 20f may read out the program 20g from the recording medium 20h and store the program 20g into the storage unit 20c.

As the recording medium 20h, illustratively a non-transitory computer-readable recording medium such as a magnetic/optical disk, a flash memory and so forth are available. As the magnetic/optical disk, illustratively a flexible disk, a compact disc (CD), a digital versatile disc (DVD), a Blu-ray (registered trademark) disk, a holographic versatile disc (HVD) and so forth are available. As the flash memory, illustratively a semiconductor memory such as a USB memory or an SD card is available.

The HW configuration of the computer 20 described above is exemplary. Accordingly, increase or decrease of HW in the computer 20 (for example, addition or deletion of an arbitrary block), division, integration in arbitrary combination, addition or deletion of a bus and so forth may be performed suitably. For example, in the information processing apparatus 1 and the server 10, at least one of the I/O unit 20e and the reading unit 20f may be omitted.

(2) Others

The technology relating to the embodiment described above can be carried out in such a modified or altered form as described below.

For example, the processing functions 12 to 19 provided in the server 10 depicted in FIG. 5 may individually be merged or divided in arbitrary combinations.

It is to be noted that, although it is described in the description of the embodiment that the target and the image are an interventricular septum and an echo image, respectively, they are not restrictive. The technique according to the embodiment can be applied also to various objects and images as described below.

As the target, for example, in addition to a part of the human body, various objects in regard to which one or both of the size and the amount of movement of the target is comparatively small with respect to the total region of an image are available. Further, the target does not have to be an object that can be viewed with the naked eye, for example, like an object at least part of which is buried in the ground. As the image, various images obtained by photographing a region including a target are available. For example, as the image, various images are available including an ultrasonic image other than an echo image, a magnetic resonance image, an X-ray image, a detection image by a sensor that captures a temperature, electromagnetic waves or the like, and a captured image by an image sensor that captures visible light or invisible light.

Further, the server 10 depicted in FIG. 5 may be configured such that the various processing functions are implemented by multiple apparatus that cooperate with each other through a network. As an example, the acquisition unit 16 and the outputting unit 19 may be a Web server; the NNWs 12 to 15, training unit 17 and execution unit 18 may be an application server; and the memory unit 11 may be a database (DB) server. In this case, the Web server, application server and DB server may cooperate with each other through a network to implement the processing functions as the server 10.

Furthermore, the processing functions relating to the training process of the NNWs 14 and 15 (acquisition unit 16 and training unit 17) and the estimation process (execution unit 18 and outputting unit 19) may be provided by devices different from each other. Also in this case, the devices may cooperate with each other through a network to implement the processing functions as the server 10.

According to one aspect, the robustness of a frame image against noise in object detection in a frame image of moving image data can be improved.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a training program that causes a computer to execute a process comprising:
    acquiring training data including moving image data obtained by photographing a target and a plurality of annotation images each indicative of a region of the target in each of a plurality of frame images included in the moving image data; and
    executing a training process using the training data, wherein the training process comprises:
        detecting the target included in the plurality of frame images;
        inputting a combined image to an auto-encoder, the combined image being obtained by combining a plurality of partial images, each of the plurality of partial images including the target and a peripheral region of the target, the plurality of partial images being detected in a given number of preceding and succeeding second frame images in a time series of the moving image data of a first frame image from among the plurality of frame images;
        inputting a partial image, in the plurality of partial images, corresponding to the first frame image to a neural network that performs a segmentation process for an image; and
        performing parameter update of the auto-encoder and the neural network, based on a difference between a combination output image obtained by combining an output image from the auto-encoder and an output image from the neural network and a partial image of the annotation image indicative of a region of the target in the first frame image.

2. The non-transitory computer-readable recording medium according to claim 1, wherein
    the training process comprises:
        inputting a feature relating to the entire first frame image obtained by inputting the first frame image to a trained model, to an intermediate layer of the auto-encoder, the trained model being produced using a dataset of an image different from an image obtained by photographing the target and estimating a label for an input image.

3. The non-transitory computer-readable recording medium according to claim 1, wherein
    the target included in the plurality of frame images is detected using a trained object detection model that is generated using a dataset including a plurality of images obtained by photographing the target and that specifies a region of the target included in an input image.

4. The non-transitory computer-readable recording medium according to claim 1, the process further comprising:
    acquiring target data including target moving image data obtained by photographing an estimation target;
    detecting the estimation target included in each of a plurality of target frame images included in the target moving image data;
    inputting, to the auto-encoder trained by the parameter update, a second combined image obtained by combining a second plurality of partial images, each of the second plurality of partial images including the estimation target and a second peripheral region of the estimation target, the second plurality of partial images being detected in a given number of preceding and succeeding fourth frame images of a third frame image in a time series of the target moving image data;
    inputting a second partial image, in the second plurality of partial images, corresponding to the third frame image to the neural network trained by the parameter update; and
    outputting an image including a region estimated as the estimation target in the third frame image based on a second combination output image obtained by combining a second output image from the auto-encoder and a second output image from the neural network and position information indicative of a position at which the second partial image in the third frame image is cut out.

5. The non-transitory computer-readable recording medium according to claim 1, wherein
each of the plurality of frame images is an ultrasonic image.

6. The non-transitory computer-readable recording medium according to claim 4, wherein
each of the plurality of frame images and the plurality of target frame images is an ultrasonic image.

7. A method executed by a computer, the method comprising:
acquiring training data including moving image data obtained by photographing a target and a plurality of annotation images each indicative of a region of the target in each of a plurality of frame images included in the moving image data; and
executing a training process using the training data, wherein the training process comprises:
detecting the target included in the plurality of frame images;
inputting a combined image to an auto-encoder, the combined image being obtained by combining a plurality of partial images, each of the plurality of partial images including the target and a peripheral region of the target, the plurality of partial images being detected in a given number of preceding and succeeding second frame images in a time series of the moving image data of a first frame image from among the plurality of frame images;
inputting a partial image, in the plurality of partial images, corresponding to the first frame image to a neural network that performs a segmentation process for an image; and
performing parameter update of the auto-encoder and the neural network, based on a difference between a combination output image obtained by combining an output image from the auto-encoder and an output image from the neural network and a partial image of the annotation image indicative of a region of the target in the first frame image.

8. The method according to claim 7, wherein
the training process comprises:
inputting a feature relating to the entire first frame image obtained by inputting the first frame image to a trained model, to an intermediate layer of the auto-encoder, the trained model being produced using a dataset of an image different from an image obtained by photographing the target and estimating a label for an input image.

9. The method according to claim 7, wherein
the target included in the plurality of frame images is detected using a trained object detection model that is generated using a dataset including a plurality of images obtained by photographing the target and that specifies a region of the target included in an input image.

10. The method according to claim 7, the method further comprising:
acquiring target data including target moving image data obtained by photographing an estimation target;
detecting the estimation target included in each of a plurality of target frame images included in the target moving image data;
inputting, to the auto-encoder trained by the parameter update, a second combined image obtained by combining a second plurality of partial images including the estimation target and a second peripheral region of the estimation target detected in a given number of preceding and succeeding fourth frame images of a third frame image in a time series of the target moving image data;
inputting a second partial image, in the second plurality of partial images, corresponding to the third frame image to the neural network trained by the parameter update; and
outputting an image including a region estimated as the estimation target in the third frame image based on a second combination output image obtained by combining a second output image from the auto-encoder and a second output image from the neural network and position information indicative of a position at which the second partial image in the third frame image is cut out.

11. The method according to claim 7, wherein each of the plurality of frame images is an ultrasonic image.

12. The method according to claim 10, wherein each of the plurality of frame images and the plurality of target frame images is an ultrasonic image.

13. An information processing apparatus, comprising:
a memory; and
a processor coupled to the memory, the processor being configured to:
acquire training data including moving image data obtained by photographing a target and a plurality of annotation images indicative of a region of the target in each of a plurality of frame images included in the moving image data; and
execute a training process of an auto-encoder and a neural network, which performs a segmentation process for an image, using the training data, wherein the processor performs, in the training process:
detecting the target included in the plurality of frame images;
inputting a combined image to the auto-encoder, the combined image being obtained by combining a plurality of partial images, each of the plurality of partial images including the target and a peripheral region of the target, the plurality of partial images being detected in a given number of preceding and succeeding second frame images in a time series of the moving image data of a first frame image from among the plurality of frame images;
inputting a partial image, in the plurality of partial images, corresponding to the first frame image to the neural network; and
performing parameter update of the auto-encoder and the neural network, based on a difference between a combination output image obtained by combining an output image from the auto-encoder and an output image from the neural network and a partial image of the annotation image indicative of a region of the target in the first frame image.

14. The information processing apparatus according to claim 13, wherein,
in the training process, the processor inputs a feature relating to the entire first frame image obtained by inputting the first frame image to a trained model, to an intermediate layer of the auto-encoder, the trained model being produced using a dataset of an image different from an image obtained by photographing the target and estimates a label for an input image.

15. The information processing apparatus according to claim 13, wherein the target included in the plurality of frame images is detected using a trained object detection model, which is produced using a dataset including a plurality of images obtained by photographing the target and that specifies a region of the target included in an input image.

16. The information processing apparatus according to claim 13, wherein the processor:

acquires target data including target moving image data obtained by photographing an estimation target;

detects an estimation target included in each of a plurality of target frame images included in the target moving image data;

inputs, to the auto-encoder trained by the parameter update, a second combined image obtained by combining a second plurality of partial images including the estimation target and a second peripheral region of the estimation target detected in a given number of preceding and succeeding fourth frame images of a third frame image in a time series of the target moving image data;

inputs a second partial image, in the second plurality of partial images, corresponding to the third frame image to the neural network trained by the parameter update; and outputs an image including a region estimated as the estimation target in the third frame image based on a second combination output image obtained by combining second output image from the auto-encoder and a second output image from the neural network and position information indicative of a position at which the second partial image in the third frame image is cut out.

17. The information processing apparatus according to claim 13, wherein each of the plurality of frame images is an ultrasonic image.

18. The information processing apparatus according to claim 16, wherein each of the plurality of frame images and the plurality of target frame images is an ultrasonic image.

* * * * *